(12) United States Patent
Sree Prakash et al.

(10) Patent No.: US 12,333,289 B2
(45) Date of Patent: Jun. 17, 2025

(54) CONTAINER IMAGE OPTIMIZATION FOR A SELECTED DEPLOYMENT ENVIRONMENT

(71) Applicant: INTERNATIONAL BUSINESS MACHINES CORPORATION, Armonk, NY (US)

(72) Inventors: Ashok Pon Kumar Sree Prakash, Bangalore (IN); Padmanabha Venkatagiri Seshadri, Mysore (IN); Harikrishnan Balagopal, Thrissur (IN); Akash Nayak, Raipur (IN)

(73) Assignee: INTERNATIONAL BUSINESS MACHINES CORPORATION, Amork, NY (US)

( * ) Notice: Subject to any disclaimer, the term of this patent is extended or adjusted under 35 U.S.C. 154(b) by 129 days.

(21) Appl. No.: 17/806,320

(22) Filed: Jun. 10, 2022

(65) Prior Publication Data
US 2023/0401050 A1 Dec. 14, 2023

(51) Int. Cl.
*G06F 8/61* (2018.01)
*G06F 9/455* (2018.01)

(52) U.S. Cl.
CPC ............ *G06F 8/63* (2013.01); *G06F 9/45558* (2013.01); *G06F 2009/45562* (2013.01); *G06F 2009/4557* (2013.01)

(58) Field of Classification Search
CPC ..................................... G06F 8/63; G06F 8/65
See application file for complete search history.

(56) References Cited

U.S. PATENT DOCUMENTS

| 11,256,493 | B1 | 2/2022 | Venkataraman Palani |
| 11,281,443 | B1 | 3/2022 | Brandes |
| 11,675,913 | B2* | 6/2023 | Wolfson ............... G06F 21/629 713/189 |
| 11,934,811 | B2* | 3/2024 | Burgazzoli ............. G06F 8/433 |

(Continued)

FOREIGN PATENT DOCUMENTS

WO 2023/237947 A1 12/2023

OTHER PUBLICATIONS

Denninnart, Chavit et al., "Efficiency in the Serverless Cloud Computing Paradigm: A Survey Study," Oct. 2021, pp. 1-19.

(Continued)

*Primary Examiner* — Duy Khuong T Nguyen
(74) *Attorney, Agent, or Firm* — Tihon Poltavets, Esq; Kevin P. Radigan, Esq.; Heslin Rothenberg Farley & Mesiti P.C.

(57) ABSTRACT

Container image optimization is provided for a deployment environment. An indication of a plurality of container images to be deployed in a deployment to provide a plurality of services within a computing environment is obtained. The plurality of container images of the deployment has a total layer size of a plurality of image layers of the plurality of container images. At least one container image of the plurality of container images is reconfigured to adjust the total layer size for the deployment. The reconfiguring is based on one or more deployment characteristics of the deployment and includes replacing at least one image layer of a container image of the at least one container image with one or more other image layers configured based on the plurality of container images to be deployed.

25 Claims, 18 Drawing Sheets

(56) References Cited

U.S. PATENT DOCUMENTS

| | | | |
|---|---|---|---|
| 12,045,597 B2* | 7/2024 | Chen | G06F 9/44536 |
| 12,190,144 B1* | 1/2025 | Featonby | H04L 67/568 |
| 2017/0255462 A1* | 9/2017 | Azagury | G06F 9/30145 |
| 2020/0241867 A1* | 7/2020 | Gainsborough | G06F 8/63 |
| 2020/0278877 A1* | 9/2020 | Scrivano | G06F 8/63 |
| 2021/0004251 A1 | 1/2021 | Skourtis et al. | |
| 2021/0096894 A1 | 4/2021 | Rupprecht | |
| 2021/0240734 A1* | 8/2021 | Shah | G06F 8/63 |
| 2021/0255846 A1 | 8/2021 | Mamgain | |
| 2022/0229647 A1* | 7/2022 | Mathews | G06F 9/45558 |

OTHER PUBLICATIONS

Notification of Transmittal of the International Search Report and the Written Opinion of the International Seraching Authority or the Declaration, PCT/IB2023/054859, Aug. 28, 2023, 17 pages.

"GitHub—docker-slim/docker-slim" Downloaded from internet Apr. 2022, pp. 1-84 (https://github.com/dockerslim/docker-slim).

Anwar, Ali et al., "Improving Docker Registry Design Based On Production Workload Analysis," FAST'18: Proceedings of the 16th USENIX Conference on File and Storage Technologies, Feb. 2018, pp. 265-278.

Benevides, Rafael, "Keep It Small: A Closer Look At Docket Image Sizing," Mar. 9, 2016, pp. 1-8.

Benni, Benjamin et al., "Supporting Micro-Services Deployment in a Safer Way: A Static Analysis and Automated Rewriting Approach," SAC '18: Proceedings of the 33rd Annual ACM Symposium on Applied Computing, Apr. 2018, pp. 1-2 (Abstract).

Fan, Hao et al., "Gear: Enable Efficient Container Storage and Deployment with a New Image Format," ICDCS'21—41st IEEE International Conference on Distributed Computing Systems, Jul. 2021, pp. 1-11.

Harter, Tyler et al., "Slacker: Fast Distribution with Lazy Docker Containers," Proceedings of the 14th USENIX Conference on File and Storage Technologies, Feb. 2016, pp. 181-195.

Mell, Peter and Tim Grance, "The NIST Definition of Cloud Computing," National Institute of Standards and Technology, Information Technology Laboratory, Special Publication 800-145, Sep. 2011, pp. 1-7.

Zhao, Nannan et al., "DupHunter: Flexible High-Performance Deduplication for Docker Registries," Proceedings of the 2020 USENIX Annual Technical Conference, Jul. 2020, pp. 769-783.

Zheng, Chao et al., "Wharf: Sharing Docket Images in a Distributed File System," Oct. 2018, pp. 1-12.

Fröhlich, D., Single Node Openshift At The Manufacturing Edge, Retrieved from: https://www.redhat.com/en/blog/single-node-openshift-manufacturing-edge, Oct. 13, 2021, 9 pages.

Kappagantula, Microservice Architecture—Learn, Build, and Deploy Applications, Retrieved from: https://dzone.com/articles/microservice-architecture-learn-build-and-deploy-a, Jul. 3, 2018, 9 pages.

* cited by examiner

OBTAIN AN INDICATION OF A PLURALITY OF CONTAINER IMAGES TO BE DEPLOYED IN A DEPLOYMENT TO PROVIDE A PLURALITY OF SERVICES WITHIN A COMPUTING ENVIRONMENT ~1000

THE PLURALITY OF CONTAINER IMAGES OF THE DEPLOYMENT HAVING A TOTAL LAYER SIZE OF A PLURALITY OF IMAGE LAYERS OF THE PLURALITY OF CONTAINER IMAGES ~1002

RECONFIGURE AT LEAST ONE CONTAINER IMAGE OF THE PLURALITY OF CONTAINER IMAGES TO ADJUST THE TOTAL LAYER SIZE FOR THE DEPLOYMENT ~1004

THE RECONFIGURING BEING BASED ON ONE OR MORE DEPLOYMENT CHARACTERISTICS OF THE DEPLOYMENT (E.G., LAYER USAGE CHARACTERISTICS; AND/OR AT LEAST ONE CHARACTERISTIC OF THE ENVIRONMENT, SUCH AS CACHE CONTENTS OF AT LEAST ONE NODE IN WHICH ONE OR MORE CONTAINER IMAGES OF THE PLURALITY OF CONTAINER IMAGES IS TO BE DEPLOYED) AND INCLUDING REPLACING AT LEAST ONE IMAGE LAYER OF A CONTAINER IMAGE OF THE AT LEAST ONE CONTAINER IMAGE WITH ONE OR MORE OTHER IMAGE LAYERS CONFIGURED BASED ON THE PLURALITY OF CONTAINER IMAGES TO BE DEPLOYED ~1010

THE CONTAINER IMAGE INCLUDES A SET OF IMAGE LAYERS ~ 1020

RECONFIGURING INCLUDES

DETERMINING, USING THE SET OF IMAGE LAYERS, ONE OR MORE IMAGE LAYER CONFIGURATIONS FOR THE CONTAINER IMAGE ~1030

COMPARING AT LEAST ONE IMAGE LAYER CONFIGURATION OF THE CONTAINER IMAGE WITH AT LEAST ONE IMAGE LAYER CONFIGURATION OF AT LEAST ONE OTHER CONTAINER IMAGE TO DETERMINE MULTIPLE LAYER CONFIGURATION VARIANTS ~1032

A LAYER CONFIGURATION VARIANT OF THE MULTIPLE LAYER CONFIGURATION VARIANTS INCLUDES AT LEAST ONE RECONFIGURED IMAGE LAYER ~1034

SELECTING, FROM THE MULTIPLE LAYER CONFIGURATION VARIANTS, A SELECTED LAYER CONFIGURATION VARIANT TO BE USED IN THE REPLACING THE AT LEAST ONE IMAGE LAYER OF THE CONTAINER IMAGE ~ 1036

FIG. 10A

THE SELECTING IS BASED ON RESIDUAL COSTS COMPUTED FOR THE MULTIPLE LAYER CONFIGURATION VARIANTS ~1040

DETERMINE WHETHER ONE OR MORE IMAGE LAYERS OF THE MULTIPLE LAYER CONFIGURATION VARIANTS ARE SELECTED LAYERS ~1042

A COMPUTATION OF A RESIDUAL COST FOR A GIVEN LAYER CONFIGURATION VARIANT IS BASED ON WHETHER THE GIVEN LAYER CONFIGURATION VARIANT INCLUDES ONE OR MORE SELECTED LAYERS ~1044

DETERMINE CO-LOCATION INFORMATION FOR THE PLURALITY OF CONTAINER IMAGES ~1050

USE THE CO-LOCATION INFORMATION TO DETERMINE THE AT LEAST ONE OTHER CONTAINER IMAGE TO BE USED IN THE COMPARING ~1052

PROVIDE AT LEAST ONE CONFIGURATION FILE, BASED ON THE RECONFIGURING, TO DEPLOY THE AT LEAST ONE CONTAINER IMAGE ~1060

FIG. 10B

CONTAINER IMAGE OPTIMIZATION FOR A SELECTED DEPLOYMENT ENVIRONMENT

BACKGROUND

One or more aspects relate, in general, to employing containers in computing environments, and in particular, to improving use of containers and/or processing associated with the containers.

Containerization is the packaging of software code with its dependencies, such as operating system libraries and/or other dependencies, used to run the software code to create a single lightweight executable, referred to as a container. The container is portable in that it runs consistently and reliably on any information technology infrastructure.

A container is created from a container image, which is a static file that includes executable code that can be run as an isolated process on a computing or information technology infrastructure. One image may be used to run one or more containers, which are runtime instances of the container image. Containers are lightweight (e.g., they share the machine's operating system); efficient; easy to manage; secure; and portable.

The size of a container image has been considered in how well the image fits within resource constraints, such as node capacity and network usage. As an example, container images available in public or enterprise registries (collection of container repositories used to store and access container images) may not be designed for the edge in terms of fitting within the resource constraints of edge devices (e.g., devices at a boundary). The same is also true for resource constraints of other nodes. Therefore, techniques have been employed for reducing the size of container images. However, such techniques are to be improved.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media readable by at least one processing circuit to perform a method. The method includes obtaining an indication of a plurality of container images to be deployed in a deployment to provide a plurality of services within the computing environment. The plurality of container images of the deployment has a total layer size of a plurality of image layers of the plurality of container images. At least one container image of the plurality of container images is reconfigured to adjust the total layer size for the deployment. The reconfiguring is based on one or more deployment characteristics of the deployment and includes replacing at least one image layer of a container image of the at least one container image with one or more other image layers configured based on the plurality of container images to be deployed.

By performing the reconfiguring based on one or more deployment characteristics, optimizations for the deployment are achieved. For instance, the total layer size of the plurality of container images is reduced in deployment. Further, network traffic to obtain image layers of the container images is reduced, as well as storage, such as cache memory, and processing cycles used in the deployment. Processing speed is improved.

In one embodiment, the one or more deployment characteristics of the deployment include layer usage characteristics of one or more image layers of the plurality of container images to be deployed. By employing layer usage characteristics, selected layers (such as frequently used layers) may be used to replace other layers of a container image, reducing the number of layers used in a deployment.

In one embodiment, the layer usage characteristics of the one or more image layers are determined. This facilitates use of those characteristics.

In one embodiment, the one or more deployment characteristics of the deployment include at least one characteristic of the environment in which the plurality of container images is to be deployed. By employing environment characteristics, selected layers (such as cached layers) may be used to replace other layers of a container image, reducing the number of layers used in a deployment.

As an example, the at least one characteristic of the environment includes cache contents of at least one node in which one or more container images of the plurality of container images is to be deployed. This facilitates deployment and provides optimizations by using already cached layers, reducing network traffic and/or other processing associated with obtaining the layers, improving processing speed and reducing storage requirements.

In one embodiment, the container image includes a set of image layers, and the reconfiguring includes determining, using the set of image layers, one or more image layer configurations for the container image. The reconfiguring includes comparing at least one image layer configuration of the container image with at least one image layer configuration of at least one other container image to determine multiple layer configuration variants. A layer configuration variant of the multiple layer configuration variants includes at least one reconfigured image layer. The reconfiguring includes selecting, from the multiple layer configuration variants, a selected layer configuration variant to be used in the replacing the at least one image layer of the container image. The performing the comparing in the reconfiguring provides images that are optimized for a particular deployment, improving processing and reducing resource usage.

In one embodiment, the selecting is based on residual costs computed for the multiple layer configuration variants.

In one embodiment, the method further includes determining whether one or more image layers of the multiple layer configuration variants are selected layers. A computation of a residual cost for a given layer configuration variant is based on whether the given layer configuration variant includes one or more selected layers. The use of selected layers, such as frequently used layers, provides efficiencies in deployment, reduces the number of layers to be deployed and saves on resources.

In one embodiment, the method further includes determining co-location information for the plurality of container images and using the co-location information to determine the at least one other container image to be used in the comparing. Deployment optimizations are realized when the deployed images are co-located.

In one embodiment, the method further includes providing at least one configuration file, based on the reconfiguring, to deploy the at least one container image.

In one aspect, a computer program product for facilitating processing within a computing environment is provided, in which the computer program product includes one or more computer readable storage media and program instructions collectively stored on the one or more computer readable storage media readable by at least one processing circuit to perform a method. The method includes reconfiguring at least one container image of a plurality of container images to be deployed in a deployment to provide a plurality of services for the computing environment. The plurality of container images of the deployment has a total layer size for the plurality of container images, and the reconfiguring includes replacing at least one image layer of a set of image layers of a container image of the at least one container image with one or more other image layers configured based on one or more container images to be deployed to adjust the total layer size for the deployment. The reconfiguring includes determining, using the set of image layers, one or more image layer configurations for the container image, comparing at least one image layer configuration of the container image with at least one image layer configuration of at least one other container image to determine multiple layer configuration variants, and selecting, from the multiple layer configuration variants, a selected layer configuration variant to be used in the replacing the at least one image layer of the container image.

By performing the reconfiguring, optimizations for the deployment are achieved. For instance, the total layer size of the plurality of container images is reduced in deployment. Further, network traffic to obtain image layers of the container images is reduced, as well as storage, such as cache memory, and processing cycles used in the deployment. Processing speed is improved.

In one embodiment, the reconfiguring is based on one or more deployment characteristics of the deployment. As examples, the one or more deployment characteristics include one or more layer usage characteristics and one or more environment characteristics. By performing the reconfiguring based on one or more deployment characteristics, optimizations for the deployment are achieved. For instance, the total layer size of the plurality of container images is reduced in deployment. Further, network traffic to obtain image layers of the container images is reduced, as well as storage, such as cache memory, and processing cycles used in the deployment. Processing speed is improved.

Computer systems and computer-implemented methods relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 10A-10B depict one example of facilitating processing within a computing environment, as it relates to one or more aspects of the present invention;

DETAILED DESCRIPTION

Figure 1:
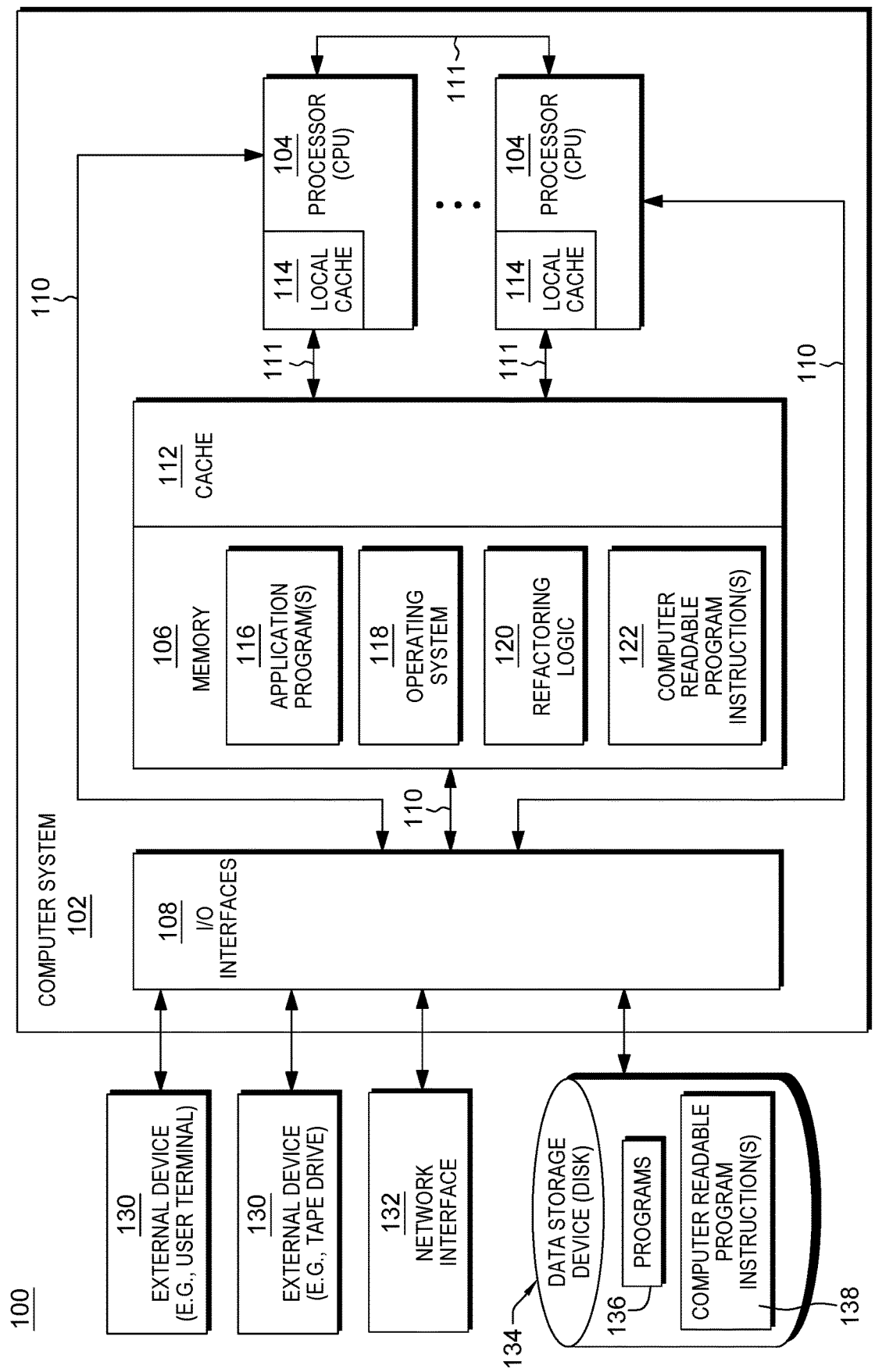
FIG. 1 depicts one example of a computing environment to include and/or use one or more aspects of the present invention.

In one or more aspects, a capability is provided to facilitate processing within a computing environment. In at least one aspect, a capability is provided to refactor (e.g., reconfigure without losing functionality) one or more container images to optimize a deployment environment in which the one or more container images are to be deployed. In one example, a plurality of container images, including at least the one or more container images to be refactored, is to be deployed in the deployment environment, and the optimization includes adjusting (e.g., reducing) a total size (e.g., a total file size) of the deployment. As examples, a total layer size of the deployment (and thus, a total image size of the deployment) is reduced by replacing multiple layers of a container image with one layer and/or replacing one layer of a container image with multiple layers to re-use a selected layer, thereby reducing the number of layers to be deployed. In one example, a total size (e.g., total layer size or total image size) of the deployment is reduced even though at least one image size of the one or more container images is increased. Thus, the images and image sizes are optimized for a given deployment environment, and the optimization is based on, for instance, deployment characteristics, including characteristics of the container images to be deployed (e.g., layer usage characteristics) and/or of the deployment environment (e.g., cache contents, such as cached layers).

In one example, a configuration file that includes directives (e.g., instructions, commands) to build a container image is refactored such that the image/image size/layer size is optimized for a given deployment environment. The optimization for a particular container image may include, for instance, one or more of the following: merging layers of an image into one layer; splitting a layer into multiple layers; adding redundancy to an image causing a layer size to increase; etc. In one example, increasing a size of the image (instead of reducing the size) enables optimization of the deployment environment by, e.g., reducing the total size of the deployment (e.g., reducing the number of layers deployed). In one example, the image size is optimized for the given deployment, absent requiring changes to an existing container life-cycle infrastructure (e.g., the tools used to create, store and use the containers). In one example, the capability considers characteristics of an enterprise catalog of services (e.g., common dependencies, co-location of services of the service catalog, etc.) and/or layer usage characteristics while designing the configuration. These characteristics may impact the resource footprint of the image.

One embodiment of a computing environment to incorporate and use one or more aspects of the present invention is described with reference to FIG. 1. As examples, the computing environment may be of any architecture that uses containers. Further, the computing environment may be any type of computing environment that uses containers, including, but not limited to, the following environments: personal computing, client-server, distributed, virtual, cloud-based, grid, time-sharing, cluster, peer-to-peer, mobile, having one node or multiple nodes, having one processor or multiple processors, and/or any other type of environment and/or configuration, etc. Aspects of the present invention are not limited to a particular architecture or environment; aspects of the invention apply to any architecture/environment that employs containers.

Referring to FIG. 1, in one example, a computing environment 100 includes, for instance, a computer system 102 shown, e.g., in the form of a general-purpose computing device. Computer system 102 may include, but is not limited to, one or more processors or processing units 104 (e.g., central processing units (CPUs) and/or special-purpose processors, etc.), a memory 106 (a.k.a., system memory, main memory, main storage, central storage or storage, as examples), and one or more input/output (I/O) interfaces 108, coupled to one another via one or more buses and/or other connections. For instance, processors 104 and memory 106 are coupled to I/O interfaces 108 via one or more buses 110, and processors 104 are coupled to one another via one or more buses 111.

Bus 111 is, for instance, a memory or cache coherence bus, and bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of one or more processors 104 via, e.g., one or more buses 111. Further, memory 106 may include one or more programs or applications 116, at least one operating system 118, refactoring logic 120 used in accordance with one or more aspects of the present invention to optimize container images for a given deployment environment, and one or more computer readable program instructions 122. Computer readable program instructions 122 may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
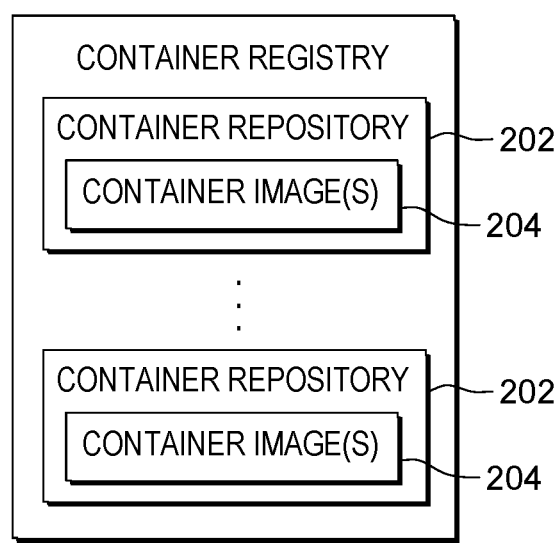
FIG. 2 depicts one example of a container registry used in accordance with one or more aspects of the present invention.

In one or more aspects, computer system 102 includes and/or has access to container images used to provide containers to be executed within computer system 102. Referring to FIG. 2, in one example, computer system 102 includes and/or has access to a container registry 200, which includes one or more container repositories 202. A container repository 202 includes, for instance, one or more container images 204 used in deploying containers. For instance, it includes layers used to build the images. As one example, a layer is stored once in a repository and may be used in building one or more images. In one example, a container image 204 is built from a configuration file that includes directives (e.g., instructions and/or commands) to build the container image.

One example of a product used to provide containers is Docker® offered by Docker, Inc. Docker is a set of platform-as-a-service products that uses operating system-level virtualization to deliver software in packages, i.e., containers. In one example, one or more Dockerfiles (an example of configuration files provided by Docker, Inc.) are used to build container images, which are deployed as containers. One example of software that may host the containers is Docker Engine, developed by Docker, Inc., which runs on an operating system (e.g., Linux® operating system, Windows® operating system, etc.). Docker® is a trademark or registered trademark of Docker, Inc. in at least one jurisdiction. The registered trademark Linux® is used pursuant to a sublicense from the Linux Foundation, the exclusive licensee of Linus Torvalds, owner of the mark on a worldwide basis. Windows® and Microsoft® are trademarks of Microsoft Corporation in the United States, other countries, or both.

A container image (also referred to herein as an image) is comprised of one or more image layers (also referred to herein as layers), and each layer has a corresponding size (e.g., a file size in, e.g., megabytes (MB) or other sizes). To determine the total layer size (or image size, as used herein) of a deployment, a size of each layer deployed (absent duplicates) is summed to provide the total size. For instance, if there are two images being deployed and image 1 has layer A (x MB), layer B (y MB) and layer C (w MB), and image 2 has layer A and layer D (z MB), then the total layer size of the deployment is x+y+w+z (x is not summed twice, even though A is in both images). In a further example, if a node in which the images are being deployed has one or more additional layers cached, such as layer E (t MB), then the total size for the deployment is x+y+w+z+t.

In accordance with an aspect of the present invention, optimization processing is performed such that the total layer size (or total image size) of the deployment is reduced. This leads to a decrease in network traffic and/or a decrease in the use of storage resources, which may lead to an increase in processing speed and efficiency. In one or more aspects, the optimization is not absolute, but instead, relative to the deployment environment. For instance, a particular image layer may be increased in size but the overall layer size for the deployment may be reduced by, e.g., reducing the layers to be retrieved from the repository and cached. Examples of optimizing image layers, and thus images, for a given deployment are described below.

One example of optimizing one or more images for a given deployment is described with reference to FIGS. 3A-3B. As an example, the optimizing includes using a split/merge protocol to enable use of a selected layer, such as a popular layer of a container registry, by one or more images to be deployed in a given deployment. As examples, a layer is considered popular if it has a popularity ranking (e.g., based on use, inclusion in images, etc.) of a certain value or if it has a popularity ranking within a range of popularity rankings, etc. Although examples of determining popularity of a layer and/or of a selected layer are provided, these are only examples and not meant to be limiting in any way. Other selected layers may be chosen based on other criteria (e.g., size and/or other characteristics) and/or other techniques for determining popularity and/or popularity rankings may be used. Many variations are possible.

Figure 3A:
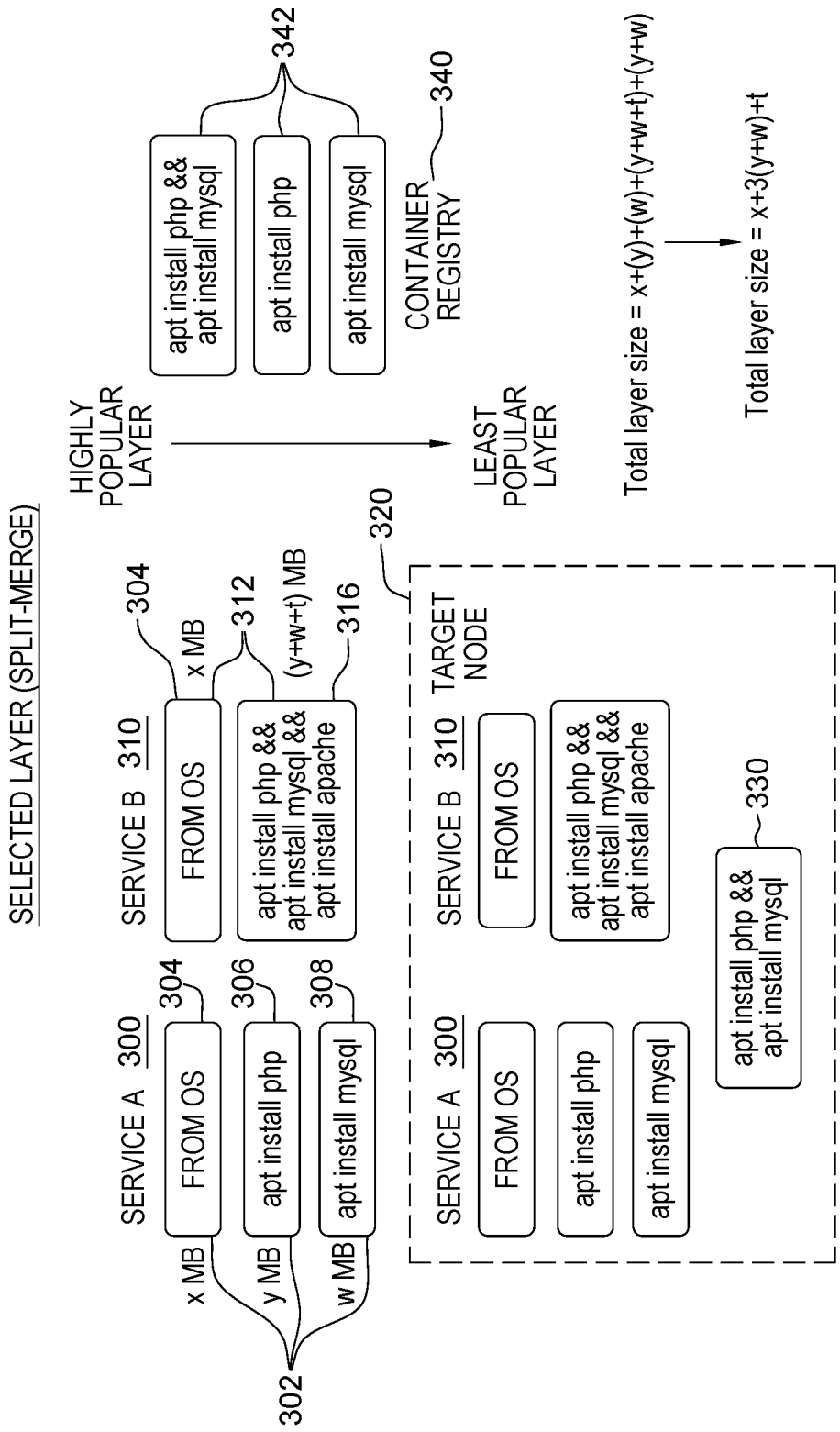
FIGS. 3A-3B depict one example of optimizing container images for a given deployment in which the optimizing employs a split/merge protocol to enable use of a selected container image layer for multiple container images, in accordance with one or more aspects of the present invention.

Referring to FIG. 3A, an image 300 for a service, Service A, is depicted. Service A may be any type of service including, but not limited to, a server, a database, an executable program, etc. The image includes a plurality of layers 302 including, for instance, layers 304, 306 and 308, each having one or more directives (e.g., instructions, commands, etc.). Layer 304 includes, e.g., a FROM instruction that indicates which base operating system image to use. An example operating system is Ubuntu® developed by Canonical Ltd. Ubuntu® is a trademark or registered trademark of Canonical Ltd in at least one jurisdiction. Layer 306 includes, e.g., an apt command to install a package, such as PHP. The apt command works with Ubuntu's Advanced Package Tool (APT) to, e.g., install, delete or remove packages. In one example, apt is used to install a scripting language package, referred to as PUP. Layer 308 includes, e.g., an apt command to install a relational database management package, referred to as MySQL®. MySQL is a trademark or registered trademark of Oracle and/or its affiliates. Although particular packages and a particular operating system are provided as examples, they are not meant to be limiting in any way. Additional, fewer and/or other packages and/or operating systems may be used. Many variations are possible.

FIG. 3A depicts another image 310 for a service, Service B. Service B may be any type of service including, but not limited to, a server, a database, an executable program, etc. Image 310 includes a plurality of layers 312 including, for instance, layer 304 (similar to image 300) and another layer 316 that includes apt commands to install several packages, including, as examples, PUP, MySQL and Apache®, which is, e.g., a Hypertext Transfer Protocol (HTTP) server. Apache® is a trademark or registered trademark of The Apache Software Foundation in at least one jurisdiction. Although particular packages and a particular operating system are provided as examples, they are not meant to be limiting in any way. Additional, fewer and/or other packages and/or operating systems may be used. Many variations are possible.

In one example, as depicted in FIG. 3A, both images 300 and 310 are deployed on a node, such as target node 320. Further, in one aspect, another layer 330 is cached (and thus, deployed) on the node, since this layer is considered a highly popular layer with respect to other layers (e.g., it has a popularity ranking that is higher than other rankings; or has a ranking within a selected range; etc.). Although layer 330 is shown as cached, additional and/or other layers may also be cached. For instance, other popular layers and/or layers based on other criteria may be cached on the node. Layer 330 is just one example.

The layers, including, but not limited to, layers 306, 308 and 330, are stored in a container registry, such as container registry 340. For instance, container registry 340 includes one or more layers 342, such as layers 330, 306 and 308, and the layers may be stored based on a selected criterion, such as popularity, date stored in the repository, and/or other criteria. In a further example, layer 304, layer 316 and/or additional, fewer and/or other layers may be stored in the repository. The layers may be stored with informational information or metadata, such as popularity ranking and/or other information. The registry may be stored on a computer system, such as computer system 102, coupled to a computer system, in the cloud, etc. Various examples are possible.

In accordance with an aspect of the present invention, certain optimizations may be employed in deploying images on, e.g., one or more nodes, such as a target node (e.g., target node 320). For instance, a split/merge protocol may be used to determine that a selected layer (e.g., a popular layer) may be deployed for use by multiple images in place of one or more other layers. For instance, it is determined that a selected layer (e.g., a popular layer) already cached (or to be cached) on a node participating in the deployment is a combination of multiple layers of an image. For example, it is determined, in one aspect, that selected layer 330 (apt install php && apt install mysql) is a merge of layer 306 (apt install php) and layer 308 (apt install mysql). Thus, those layers (e.g., layers 306 and 308) may be replaced by layer 330. For instance, as shown in FIG. 3B, image 300 now includes layer 330, which is a merge of layers 306 and 308.

Further, it is determined that a layer of image 310 includes the directives of layer 330. That is, in one example, layer 316 includes apt install php and apt install mysql, as well as apt install apache. Thus, layer 316 may be split into multiple layers: layer 330 that includes apt install php and apt install mysql, and another layer that includes apt install apache. For instance, as shown in FIG. 3B, image 310 now includes layer 330 (apt install php and apt install mysql) and layer 332 (apt install apache).

Figure 3B:
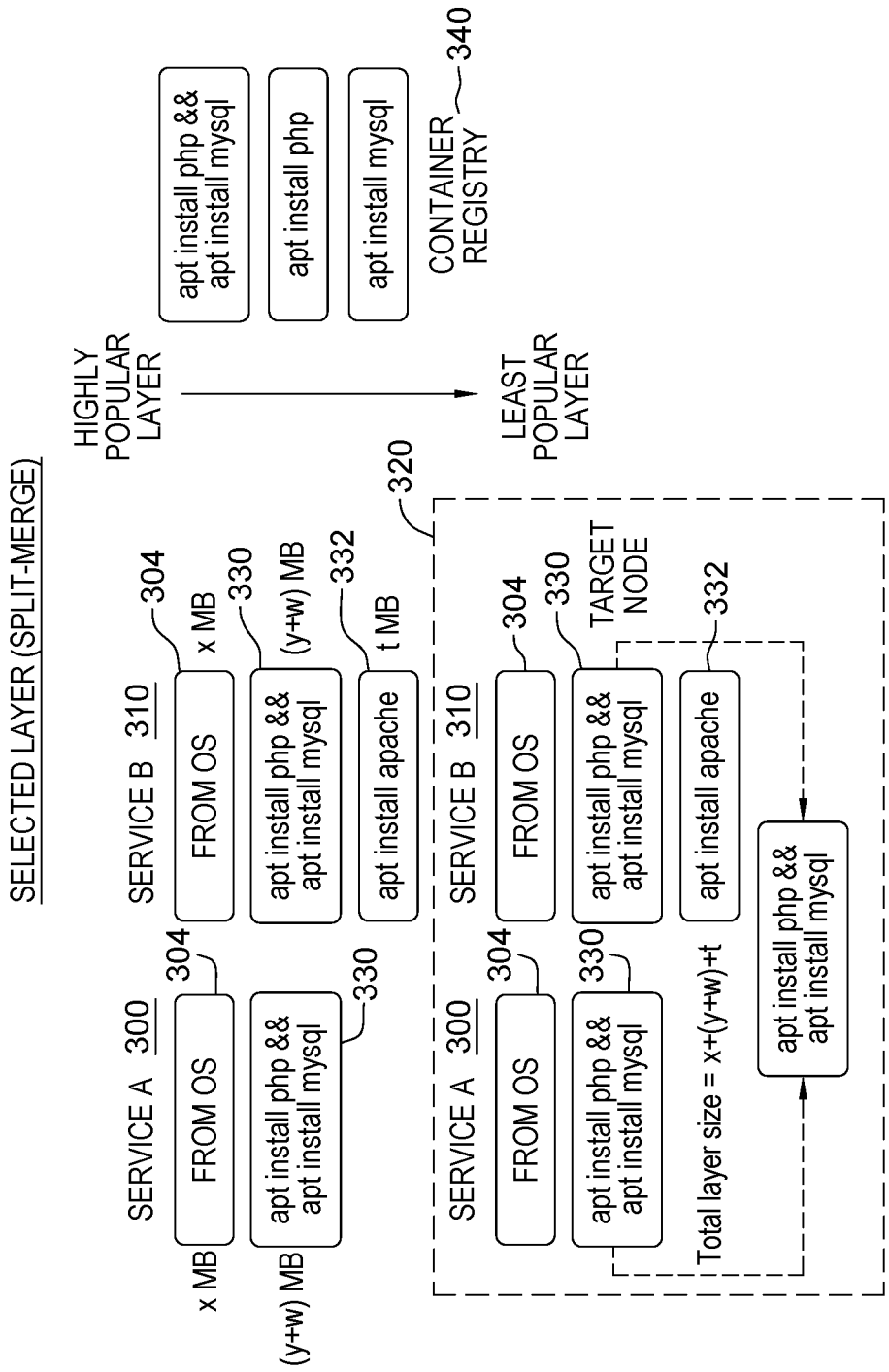

As shown in FIG. 3B, deployment of image 300 on target node 320 includes deploying layer 304 and layer 330; and deployment of image 310 includes deploying layer 304, layer 330 and layer 332. However, since layer 330 is already retrieved from the repository and cached on the node (as well as layer 304), these layers are not retrieved again or repeatedly stored. Layer 330 is used in deployment of images 300 and 310. This saves in traffic (e.g., network traffic) in accessing the repository, saves processing cycles and saves in cache space, as well as reduces processing time in deploying the images. Further, since the same layer is used for multiple images, the total size of the deployed layers and thus, deployed images is reduced. For instance, for FIG. 3A, the total layer size of the deployment is, e.g., Total Layer Size=x+3(y+w)+t, where x is the size of FROM OS (layer 304); y is the size of apt install php (layer 306; portion of layers 316, 330); w is the size of apt install mysql (layer 308; portion of layers 316, 330); and t is the size of apt install apache (portion of layer 316); and for FIG. 3B, based on applying the split/merge protocol, the total layer size for the deployed images is, e.g., Total Layer Size=x+(y+w)+t.

Another example of optimizing images for a given deployment, in accordance with an aspect of the present invention, is described with reference to FIGS. 4A-4B. In this example, tactical redundancy of a selected layer (e.g., a popular layer) is employed.

Figure 4A:
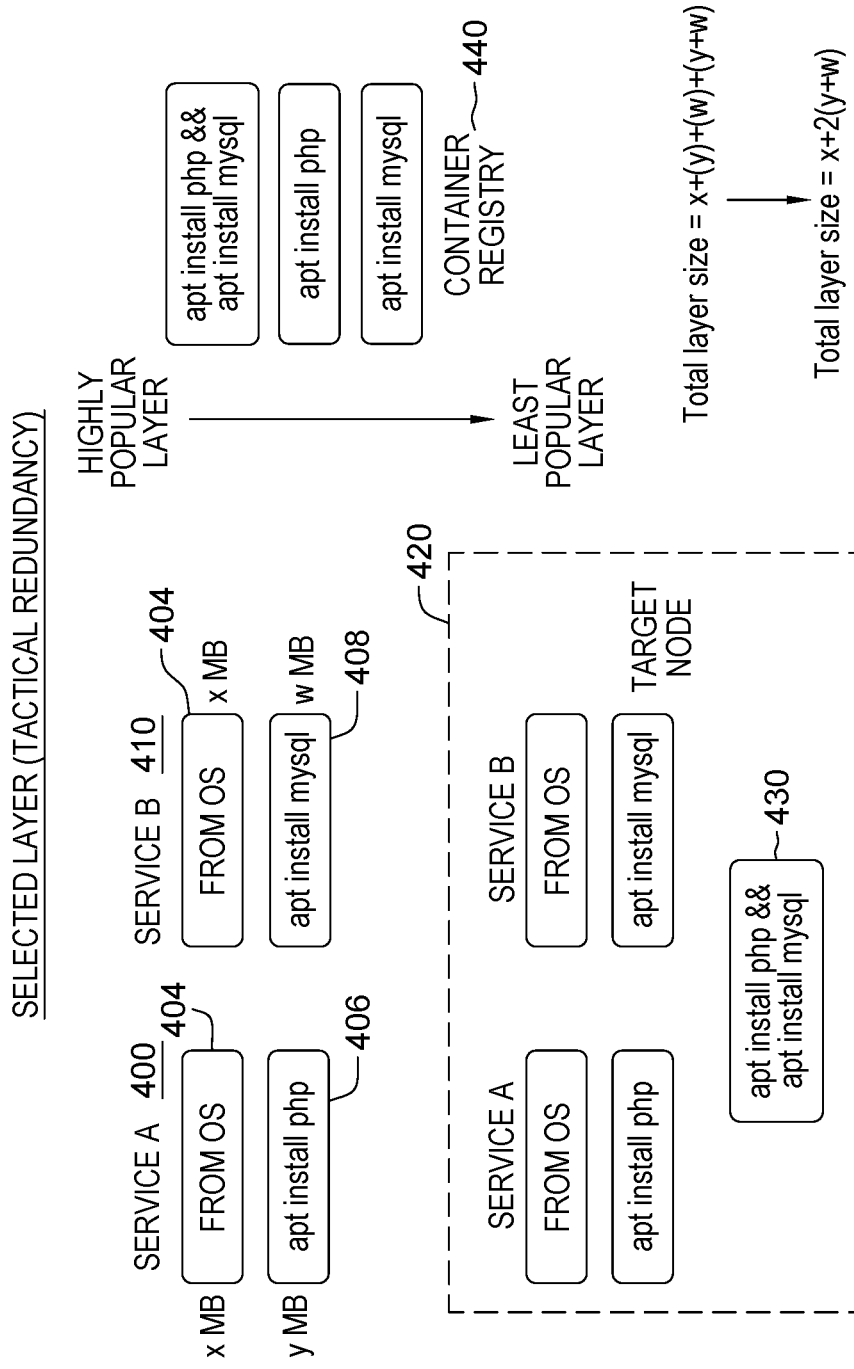
FIGS. 4A-4B depict one example of optimizing container images for a given deployment in which the optimizing employs a tactical redundancy protocol of a selected layer, in accordance with one or more aspects of the present invention.

Referring to FIG. 4A, an image 400 for a service, Service A, is depicted. Service A may be any type of service including, but not limited to, a server, a database, an executable program, etc. The image includes a plurality of layers including, for instance, layer 404 that includes a FROM instruction that indicates which base operating system image (e.g., Ubuntu) to use, and another layer 406 that includes an apt command to install a PUP package. Further, FIG. 4A depicts another image 410 for a service, Service B. Service B may be any type of service including, but not limited to, a server, a database, an executable program, etc. Image 410 includes a plurality of layers including, for instance, layer 404 (similar to image 400) and another layer 408 that includes an apt command to install a MySQL package. Although particular packages and a particular operating system are provided as examples, they are not meant to be limiting in any way. Additional, fewer and/or other packages and/or operating systems may be used. Many variations are possible.

In one example, as depicted in FIG. 4A, both images 400 and 410 are deployed on a target node 420. Further, in one aspect, another layer 430 is cached on the node, since, in one example, this layer is considered a popular layer with respect to other layers (e.g., it has a popularity ranking that is higher than other rankings; or has a ranking within a selected range; etc.). Although layer 430 is shown as cached, additional and/or other layers may also be cached. For instance, other popular layers and/or other layers based on other criteria may be cached on the node. Layer 430 is just one example.

The layers, including, but not limited to, layers 406, 408 and 430, are stored in a container registry, such as container registry 440. For instance, container registry 440 includes one or more layers, such as layers 430, 406 and 408, and the layers may be stored based on a selected criterion, such as popularity, date stored in the repository, and/or other criteria. In a further example, layer 404 and/or additional, fewer and/or other layers may be stored in the repository. The layers may be stored with informational information or metadata, such as popularity ranking and/or other information. The registry may be stored on a computer system, coupled to a computer system, in the cloud, etc. Various examples are possible.

In accordance with an aspect of the present invention, certain optimizations may be employed in deploying images on, e.g., one or more nodes, such as a target node (e.g., target node 420). For instance, a tactical redundancy protocol may be used to determine that a selected layer (e.g., a popular layer) already cached (or to be cached) in the deployment environment may be used in deployment of multiple images in place of one or more other layers of those images. For instance, since multiple images to be deployed on a target node (or a set of nodes) include a portion of a selected layer (e.g., a popular layer), such as layer 430, then that layer may be used for both of the images. For example, since image 400 includes layer 406 (an apt install php) which is part of selected layer 430 (apt install php && apt install mysql), instead of deploying layer 406 for image 400, selected layer 430 is deployed (or used if already deployed). Although the selected layer has an additional directive, optimization is still obtained by, e.g., not pulling additional layers from the repository and not caching additional layers. Similarly, since image 410 includes layer 408 (an apt install mysql) which is part of selected layer 430 (apt install php && apt install mysql), instead of deploying layer 408 for image 410, selected layer 430 is deployed (or used if already deployed). Although the selected layer has an additional directive, optimization is still obtained by, e.g., not pulling additional layers from the repository and not caching additional layers. This is shown in FIG. 4B.

Figure 4B:
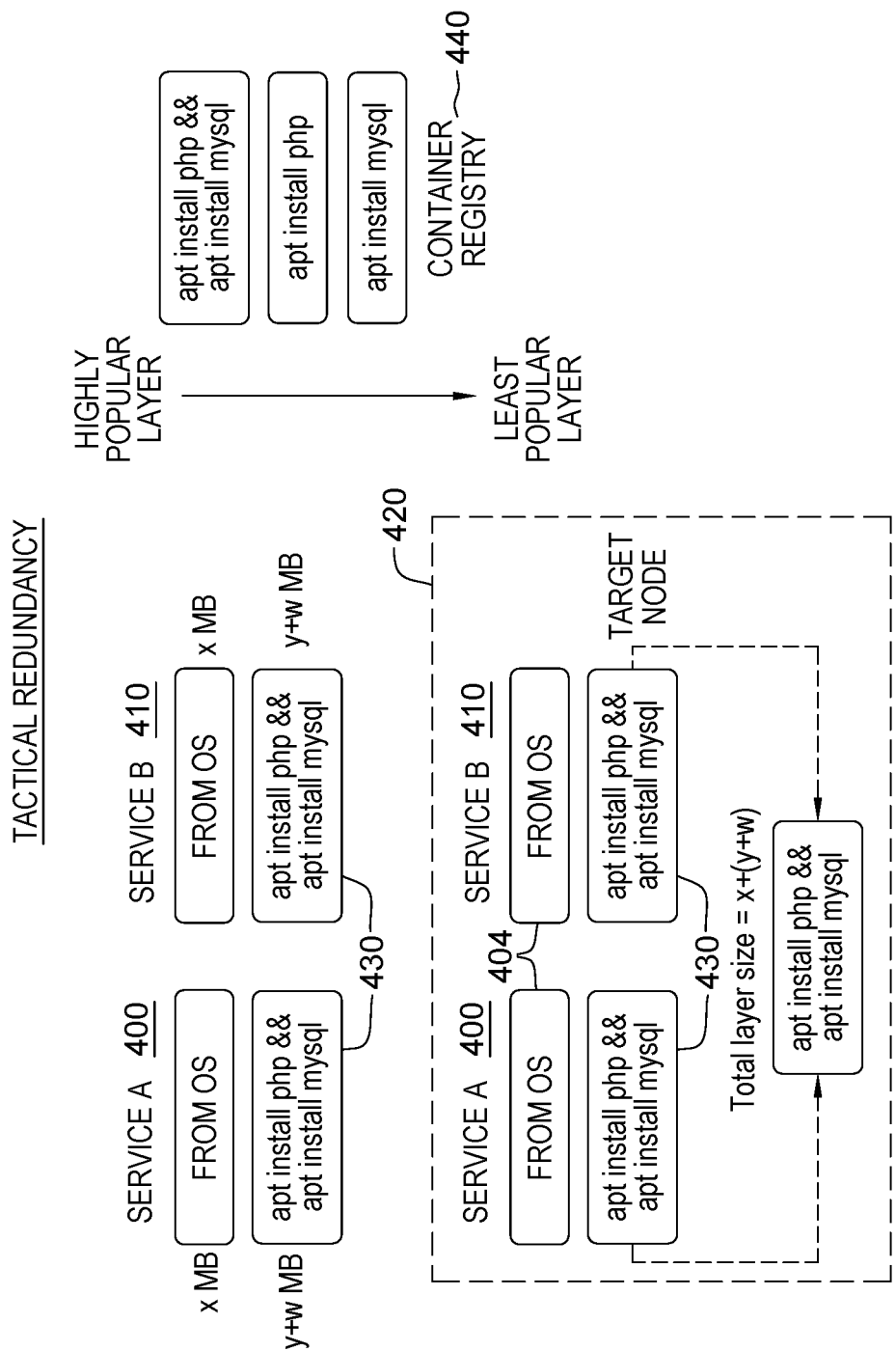

For instance, as shown in FIG. 4B, deployment of image 400 on target node 420 includes deploying layer 404 and layer 430; and deployment of image 410 includes deploying layer 404 and layer 430. However, since layer 430 is already retrieved from the repository and cached on the node (as well as layer 404), the layer is not retrieved again or repeatedly stored. This saves in traffic (e.g., network traffic) in accessing the repository and saves in cache space, as well as reduces processing time in deploying the images. Further, since the same layer is used for multiple images, the total size of images for the node is reduced. For instance, for FIG. 4A, the total layer size of the deployment is, e.g., Total Layer Size=x+(y)+(w)+(y+w), where x is the size of FROM OS (layer 404); y is the size of apt install php (layer 406; portion of layer 430); and w is the size of apt install mysql (layer 408; portion of layer 430); and for FIG. 4B, based on applying the tactical redundancy protocol, the total layer size for the deployed images is, e.g., Total Layer Size=x+(y+w).

A further example of optimizing images for a given deployment, in accordance with an aspect of the present invention, is described with reference to FIGS. 5A-5B. In this example, tactical redundancy based on inter-service commonality is employed.

Figure 5A:
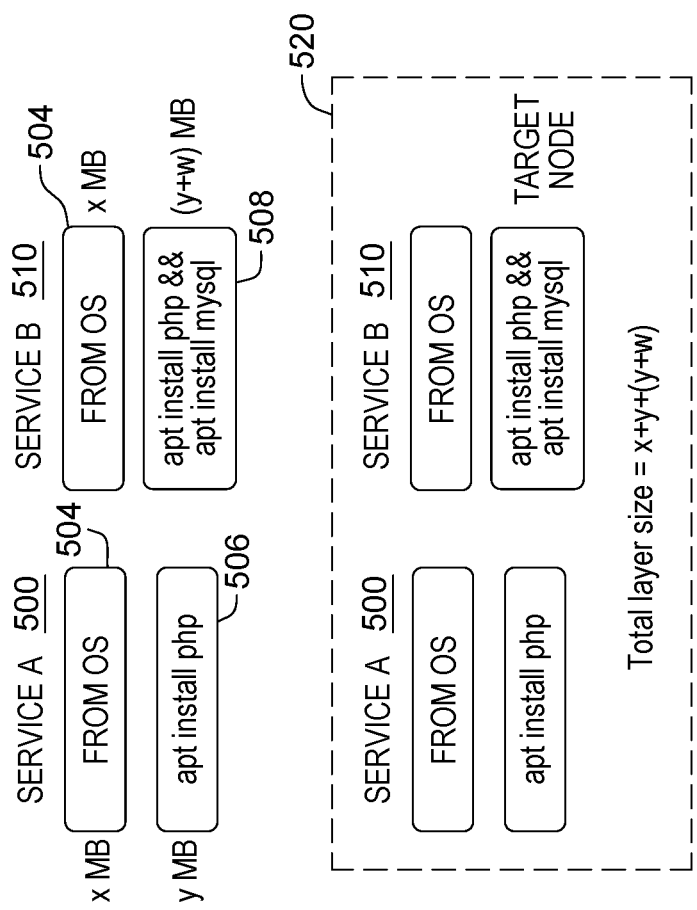
FIGS. 5A-5B depict one example of optimizing container images for a given deployment in which the optimizing employs a tactical redundancy protocol of a common inter-service container image layer, in accordance with one or more aspects of the present invention.

Referring to FIG. 5A, an image 500 for a service, Service A, is depicted. Service A may be any type of service including, but not limited to, a server, a database, an executable program, etc. The image includes a plurality of layers including, for instance, layer 504 that includes a FROM instruction that indicates which base operating system image (e.g., Ubuntu) to use, and another layer 506 that includes an apt command to install a PUP package. Further, FIG. 5A depicts another image 510 for a service, Service B. Service B may be any type of service including, but not limited to, a server, a database, an executable program, etc. Image 510 includes a plurality of layers including, for instance, layer 504 (similar to image 500) and another layer 508 that includes an apt command to install a PUP package and an apt command to install a MySQL package. Although particular packages and a particular operating system are provided as examples, they are not meant to be limiting in any way. Additional, fewer and/or other packages and/or operating systems may be used. Many variations are possible.

In one example, as depicted in FIG. 5A, images 500 and 510 are deployed on a target node, e.g., target node 520, and a total layer size for the deployed images is, e.g., Total Layer Size=x+y+(y+w).

In accordance with an aspect of the present invention, certain optimizations may be employed in deploying images on, e.g., one or more nodes, such as a target node (e.g., target node 520). For instance, a tactical redundancy protocol based on inter-service commonality of images may be used to determine that a selected layer (e.g., a redundant layer) may be deployed for multiple images in place of one or more other layers of those images. For instance, since multiple images to be deployed on a target node (or a set of nodes) include a same directive (e.g., apt install php), a layer that includes that directive may be used for both of the images. For example, since image 500 includes layer 506 (an apt install php) which is part of layer 508 (apt install php && apt install mysql), instead of deploying layer 506 for image 500, layer 508 (as a selected layer that has commonality among the images) is deployed for both. Although the selected layer has an additional directive for image 500, optimization is still obtained by not pulling additional layers from the repository and not caching additional layers. This is shown in FIG. 5B.

Figure 5B:
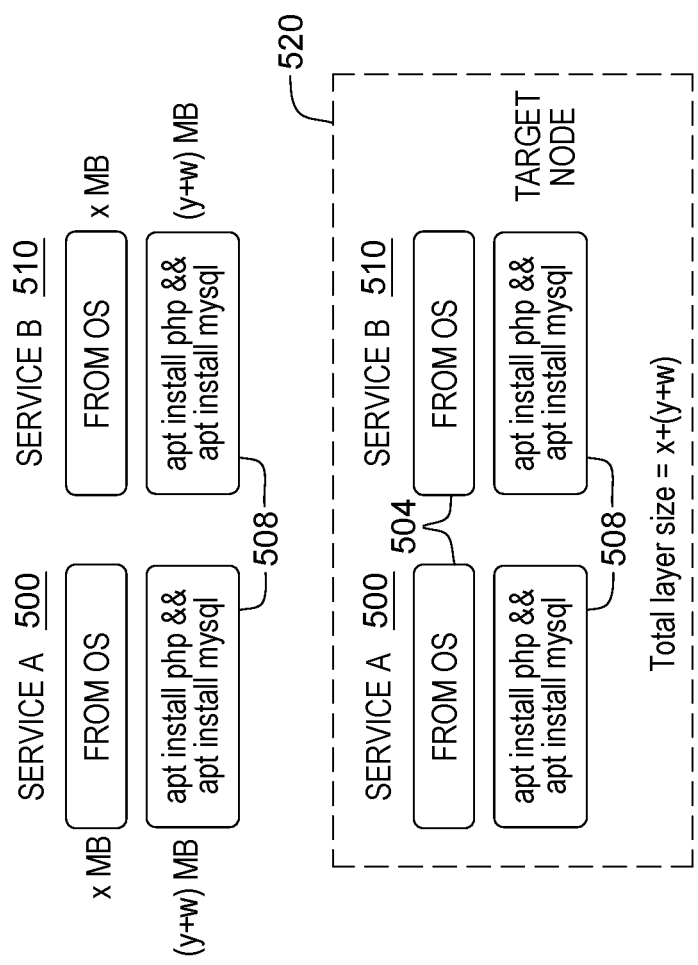

For instance, as shown in FIG. 5B, deployment of image 500 on target node 520 includes deploying layer 504 and layer 508; and deployment of image 510 also includes deploying layer 504 and layer 508. Since layer 508, as well as layer 504, is redundant, it is retrieved and stored one time. This saves in traffic (e.g., network traffic) in accessing the repository, saves in cache space, saves in processing cycles, as well as reduces processing time in deploying the images. Further, since the same layer is used for multiple images, the total size of the images for the deployment is reduced. For instance, for FIG. 5A, the total layer size for the deployed images is, e.g., Total Layer Size=x+y+(y+w), where x is the size of FROM OS (layer 504); y is the size of apt install php (layer 506; portion of layer 508); w is the size of apt install mysql (portion of layer 508); and for FIG. 5B, based on applying the tactical redundancy protocol, the total layer size for the deployed images is, e.g., Total Layer Size=x+(y+w).

Another example of optimizing one or more images for a given deployment is described with reference to FIGS. 6A-6B. As an example, the optimizing includes using a split/merge protocol to enable use of a selected layer, such as a common layer among multiple images.

Figure 6A:
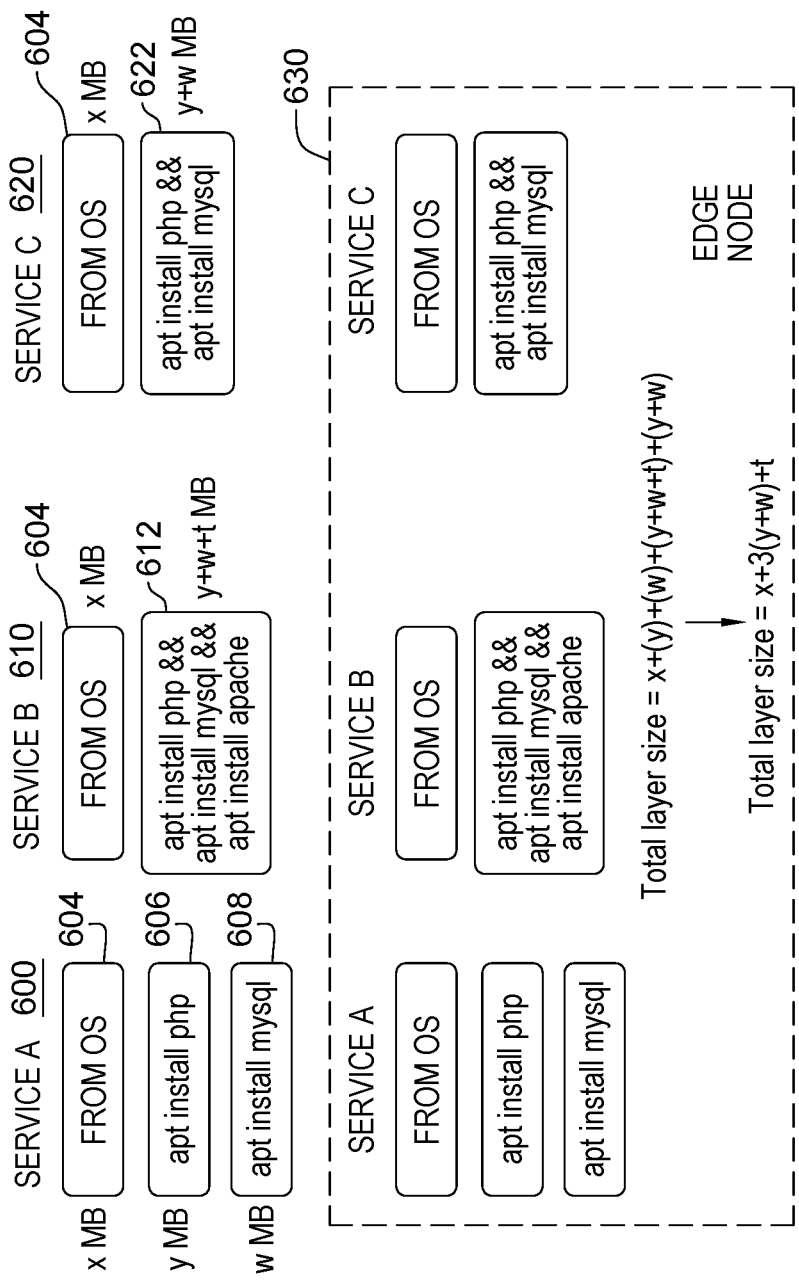
FIGS. 6A-6B depict one example of optimizing container images for a given deployment in which the optimizing employs a split/merge protocol to enable use of a common inter-service container image layer for multiple container images, in accordance with one or more aspects of the present invention.

Referring to FIG. 6A, an image 600 for a service, Service A, is depicted. Service A may be any type of service including, but not limited to, a server, a database, an executable program, etc. The image includes a plurality of layers including, for instance, layer 604 that includes a FROM instruction that indicates which base operating system image (e.g., Ubuntu) to use, layer 606 that includes an apt command to install PUP and a layer 608 which includes an apt command to install MySQL. Although particular packages and a particular operating system are provided as examples, they are not meant to be limiting in any way. Additional, fewer and/or other packages and/or operating systems may be used. Many variations are possible.

FIG. 6A depicts another image 610 for a service, Service B. Service B may be any type of service including, but not limited to, a server, a database, an executable program, etc. Image 610 includes a plurality of layers including, for instance, layer 604 (similar to image 600) and another layer 612 that includes apt commands to install several packages, including, as examples, PUP, MySQL and Apache. Although particular packages and a particular operating system are provided as examples, they are not meant to be limiting in any way. Additional, fewer and/or other packages and/or operating systems may be used. Many variations are possible.

Further, FIG. 6A depicts another image 620 for a service, Service C. Service C may be any type of service including, but not limited to, a server, a database, an executable program, etc. Image 620 includes a plurality of layers including, for instance, layer 604 (similar to images 600, 610) and another layer 622 that includes apt commands to install several packages, including, as examples, PUP and MySQL. Although particular packages and a particular operating system are provided as examples, they are not meant to be limiting in any way. Additional, fewer and/or other packages and/or operating systems may be used. Many variations are possible.

In one example, as depicted in FIG. 6A, images 600, 610 and 620 are deployed on a node, such as an edge node (e.g., edge node 630), and a total layer size for the deployed images is, e.g., Total Layer Size=x+(y)+(w)+(y+w+t)+(y+w)=x+3(y+w)+t.

In accordance with an aspect of the present invention, certain optimizations may be employed in deploying images on, e.g., one or more nodes, such as an edge node (e.g., edge node 630). For instance, a split/merge protocol may be used based on a selected layer (e.g., a common layer between images—an inter-service common layer) to determine that the selected layer may be deployed for multiple images in place of one or more other layers. For instance, since apt install php and apt install mysql are common to the multiple images, layer 622 that includes those directives, e.g., apt install php && apt install mysql layer, may be used when deploying the images on the edge node. For instance, as shown in FIG. 6B, image 600 now includes layer 622, which is a merge of layers 606 and 608; image 610 includes layer 622 and layer 624, which are split from layer 612; and image 620 includes layer 622. These layers are used when deploying the images on a node, such as edge node 630.

Figure 6B:
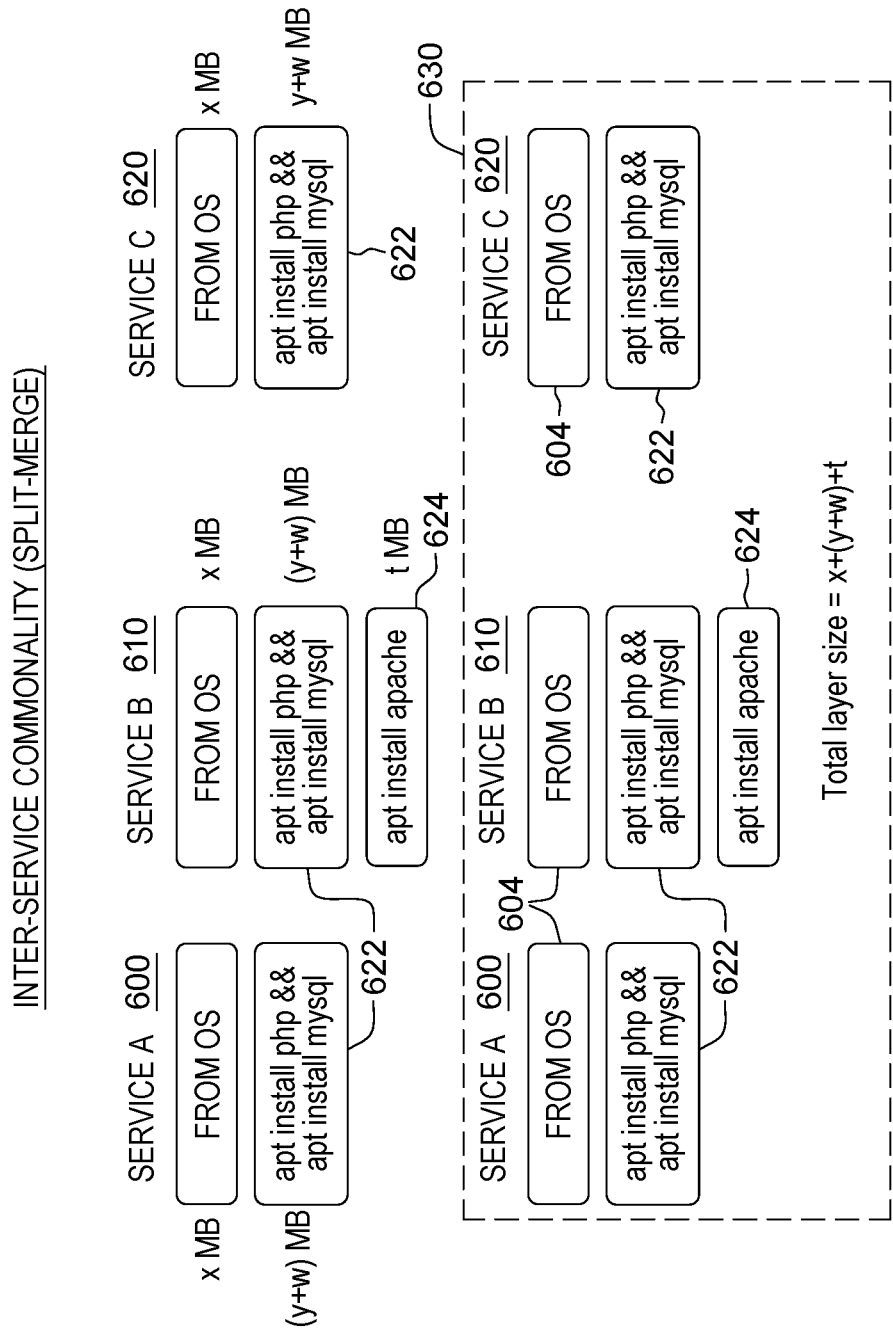

For instance, as shown in FIG. 6B, deployment of image 600 on edge node 630 includes deploying layer 604 and layer 622; deployment of image 610 includes deploying layer 604, layer 622 and layer 624; and deployment of image 620 includes deploying layer 604 and layer 622. However, since the same layer is used for multiple images, the layer is deployed once and the total size of images for the node is reduced. For instance, for FIG. 6A, the total layer size for the deployed images is, e.g., Total Layer Size=x+(y)+(w)+(y+w+t)+(y+w)=x+3(y+w)+t, where x is the size of FROM OS (layer 604); y is the size of apt install php (layer 606; portion of layer 612; portion of layer 622); w is the size of apt install mysql (layer 608; portion of layer 612; portion of layer 622); and t is the size of apt install apache (portion of layer 612); and for FIG. 6B, based on applying the split/merge protocol, the total layer size for the deployed images is, e.g., Total Layer Size=x+(y+w)+t.

As described herein, in one or more aspects, image size is optimized for a given deployment, rather than performing an absolute image size reduction. In one example, tactically adding redundancy may increase absolute image size but results in lower image sizes during deployment. Optimization may use or be based on various criteria, including, but not limited to, registry access patterns and/or service catalog characteristics. In one or more aspects, splitting and/or merging layers may lead to improved layer reuse. Optimizations are provided even though one or more individual image sizes may increase since, in deployment, fewer layers are deployed.

One example of processing (may also be referred to as logic) used to optimize images for a given deployment is described with reference to FIG. 7. In one example, processing 700 (e.g., refactoring logic 120) is performed by a processor, such as a processor 104. However, it may be performed by other processors and/or other entities of a computing environment. Further, in one or more examples, the processing may be distributed among processors and/or aspects may be performed in cloud-based systems. Many examples are possible. Execution of the process improves processing within the computing environment by reducing access to a repository, reducing storage (e.g., cache and/or other storage) used to store layers, reducing processing cycles, and/or reducing processing time in deploying the images since, e.g., fewer layers are deployed.

Figure 7:
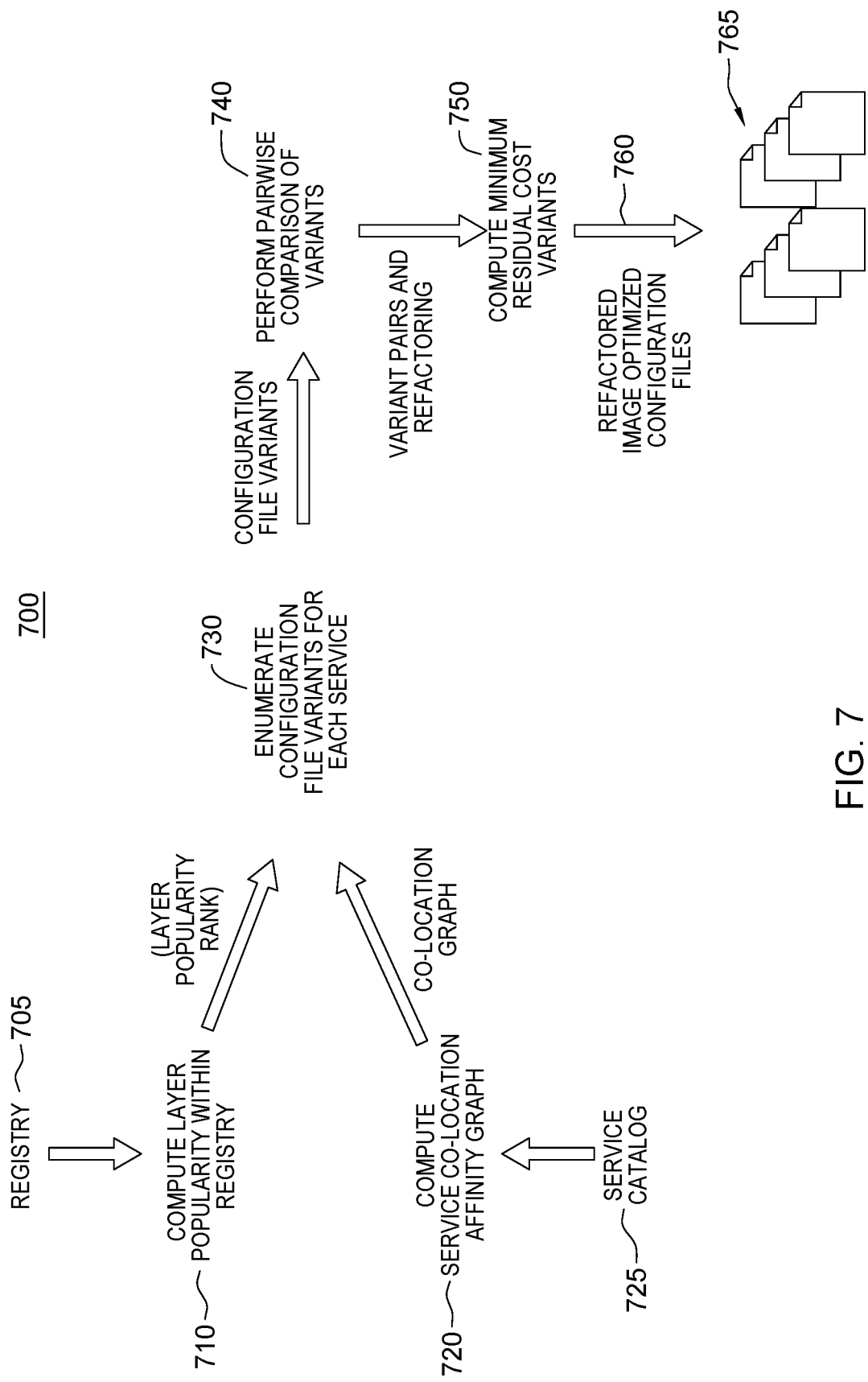
FIG. 7 depicts one example of refactoring logic to reconfigure one or more container images, in accordance with one or more aspects of the present invention.

Referring to FIG. 7, in one example, processing 700 accesses a registry 705 (e.g., registry 200, registry 340, registry 440) and determines 710 layer usage characteristics, such as, for instance, the popularity of the various layers within the repository. In one example, the processing uses pull traffic to compute the popularity of layers pulled, as well as referred to in the images stored in the container registry. This is combined, in one example, with cross-validation scores to down-rank layers with vulnerabilities. For instance, if a layer has a particular vulnerability (as defined), it may be assigned a penalty score used to downgrade its popularity. Other examples are possible. Further, in other examples, down-ranking is not performed.

The layer usage data is used, in one example, to rank the layers of the registry based on usage popularity (e.g., frequency), as one example. The determining provides, for instance, an indication of each layer ranked with it's popularity ranking. In one example, the popularity data is used to sort the layers in the container registry in, e.g., decreasing order of popularity. Other examples are possible.

Additionally, in one example, processing 700 computes 720 a service co-location affinity graph based on information provided in a service catalog 725. Service catalog 725 includes, for instance, a collection of related services with their source code. In one example, processing 700 parses through the deployment artifacts to determine the affinity section of individual services and their deployment plan. As an example, given a service catalog composed of multiple services, an interaction graph of services with directed edges denoting co-location (e.g., same machine, same node(s), or other co-location parameters) and vertices representing the services may be constructed using the following, for instance: deployment artifacts are extracted or obtained to determine the taints, affinities and tolerances associated with the services. For example, if services S1 and S2 have taints on not to be deployed on same machine type, they may not co-exist. Further, the service-catalog deployment infrastructure is considered; e.g., is it a single node cluster or multi-node cluster? Additional, fewer and/or other deployment artifacts may be taken into consideration.

The layers/popularity rankings and the co-location affinity graph (or co-location information gathered using one or more other techniques) are used by processing 700. In one example, processing 700 obtains, based on, for instance, the services to be deployed, as indicated in, e.g., the co-location affinity graph and/or service catalog, an indication of the container images to be deployed. For the services of the co-location graph (or in other examples, for the services of the catalog; identified services; etc.), in one example, processing 700 enumerates 730 configuration file (e.g., Dockerfile) variants (also referred to herein as image layer configurations) for each service (or selected services). In one example, each configuration file for a given service is used to seed variants by combining incremental combinations of its layers. This is performed for each service being considered, in one example. In another example, it is performed for one or more selected services. As an example, assuming an original configuration file with four layers (L1-L4), the following variants or image layer configurations may be generated using, e.g., incremental layer aggregation: Variant 1: L1+L2, L3, L4; Variant 2: L1+L2+L3, L4; Variant 3: L1+L2+L3+L4; Variant 4: L1, L2+L3, L4; Variant 5: L1, L2+L3+L4; Variant 6: L1, L2, L3+L4; and Variant 7 (the original configuration file): L1, L2, L3, L4. Additional, fewer and/or other variants (image layer configurations) may be provided in other examples using the same techniques or other techniques.

Further, in one example, processing 700 performs pair-wise comparison 740 of the configuration file variants providing one or more variant pairs (also referred to as layer configuration variants) and refactoring. In one example, processing 700 compares each configuration file variant of service "i" with each configuration file variant of service "j" to perform an overlap test to discover commonality in the layers and to compute residual gain in size reduction post-refactoring. For instance, assume two services, Si and Sj, are co-located (e.g., in a same node), and for each service, Si and Sj, multiple configuration file variants (or image layer configurations) are generated using, e.g., incremental layer aggregation. Each configuration file variant includes one or more layers for the service or image representing the service. The configuration file variants of Si are compared to the configuration file variants of Sj by, for instance, comparing the layers in the configuration file variants to determine, e.g., common layers. For instance, combinations of the layers of the configuration file variants being compared are created and those layer combinations are compared.

One example of comparing a pair of layers, one from each configuration file variant of a pair of configuration file variants being compared, for a pair of services is described with reference to FIG. 8. This comparing is performed for all (or selected) layers for all (or selected) variants of the services being compared. Further, the comparing is performed for selected services, such as those to be co-located or in another embodiment, for a subset of the selected services. Various embodiments are possible.

Figure 8:
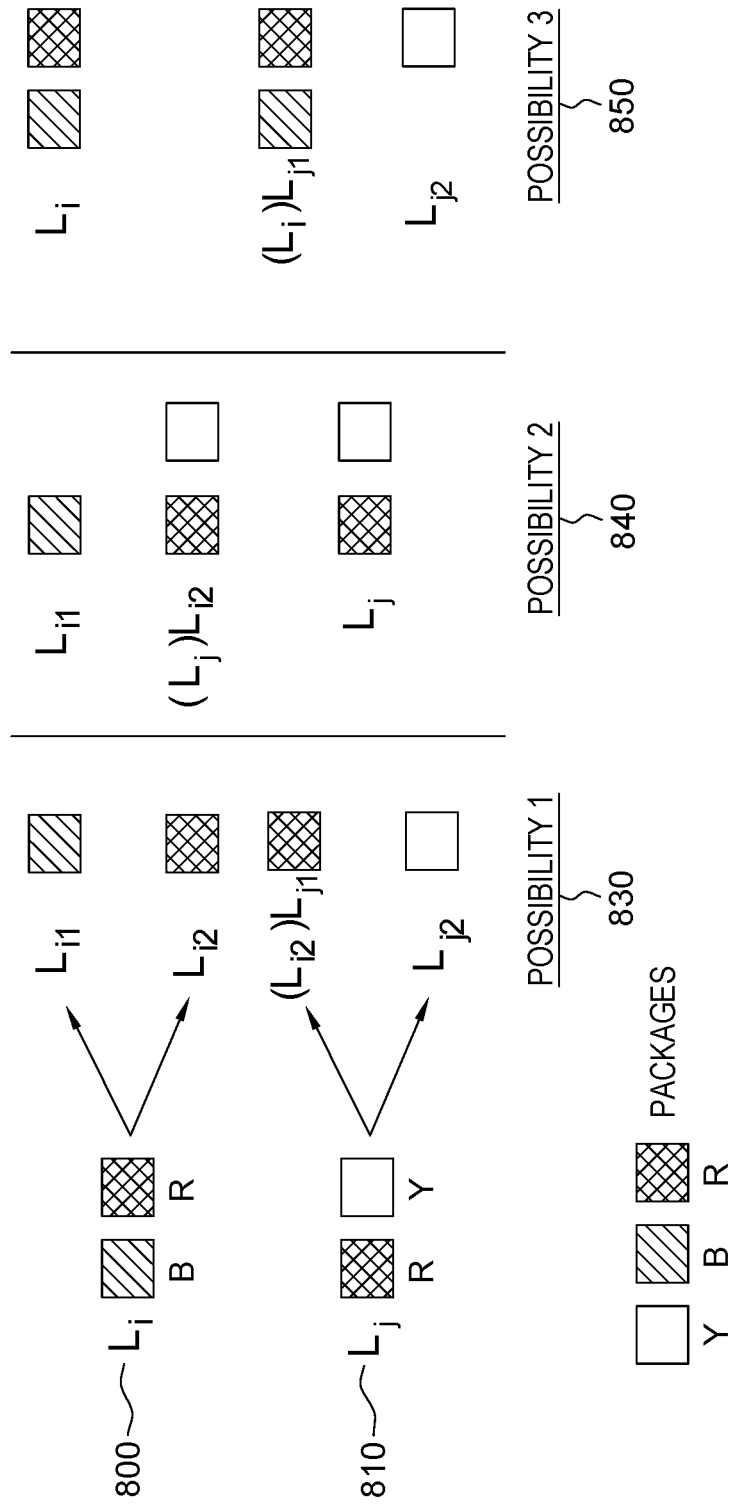
FIG. 8 depicts one example of pairwise comparison used by the refactoring logic of FIG. 7, in accordance with one or more aspects of the present invention.

Referring to FIG. 8, in one example, assume there are two layers: Layer Li (800) of a configuration file variant for Si and Layer Lj (810) of a configuration file variant for Sj. Assume Layer Li (800) includes Packages B and R, and Layer Lj (810) includes Packages R and Y. Overlap tests are performed producing, for instance, three layer configuration variants or possibilities for the pair of layers (Li, Lj) being compared for the two services (Si, Sj): Possibility 1 (830), in which Layer Li and Layer Lj are split to exploit the common package R; Possibility 2 (840), in which Layer Lj is very popular and widely available, and Li is split into Li1 and Li2, where Li2 is the same as Lj. This adds some redundance (e.g., Package Y) to the configuration file containing Li originally as it is refactored to be replaced with Li1 and Li2, but the popular layer Lj is likely to be present at target deployment thus reducing pull traffic; Possibility 3 (850): This is a mirror image of Possibility 2.

Each possibility or layer configuration variant generated using the pairwise comparison of layers of different services (e.g., two layers of two services) may include, for instance, one or more layer variants for the layers being compared. For instance, continuing with reference to FIG. 8, in possibility 1 (also referred to herein as layer configuration variant 1), layer Li of service Si is refactored from one layer having B, R to two layers, one with B and one with R; and layer Lj of service Sj is refactored from one layer having R, Y to two layers, one with R and one with Y. Similarly, for possibility 2 (also referred to herein as layer configuration variant 2), layer Li of service Si is refactored from one layer having B, R to two layers, one with B and one with R and Y (in which redundancy is added based on the layer it is compared with); and layer Lj of service Sj remains the same. Other variations are possible, one example of which is shown, but others are also possible.

In one example, for the three possibilities indicated above, the residual gain of each possibility is computed and the possibility with the maximum gain is selected. To compute the residual gain, the following equation is used, in one example:

$$\text{Estimated Residual gain} = \sum_{\text{layer } l \text{ in } D} s(l) - \sum_{\text{layer } l \text{ in } Dr} p_l . s(l)$$

Where: $p_l$: Normalized popularity of layer l
s(l): Size of layer l
D: Layers of configuration file D
$D_r$: Layers of configuration file D after refactoring
where configuration file D is a configuration file for the pair of layers being compared.

For each possible layer configuration variant of the comparisons, the estimated residual gain is computed. Further, in one example, an average of the estimated residual gains for the possible variants is determined and if the residual gain for a particular variant has a predetermined relationship with the average (e.g., at or above the average), the refactored variant is saved; otherwise, it is discarded.

Returning to FIG. 7, processing 700 computes 750, based on the computed residual gains for the layer configuration variants, minimum residual cost variants. Based thereon, processing 700 outputs 760 refactored image optimized configuration files 765 to be used in reconfiguring one or more container images to be deployed. In one example, layer configuration variants are identified based on residual size. For instance, the variant with the largest residual size gain over the services compared (or selected services) is identified, then the variant with the second largest residual size, and so on. These minimum residual cost variants will make up the configuration files for the services of the service catalog. In one example, the following procedure may be used:

S is sequence of services
Sort S in the order of maximum-average-residual-gain over all variants
D-Set={ } is set of selected variants for the services
for each service s in S:
    find max-average-residual-gain variant Di,s over (s, s') for-all s'!=s in S
    Add Di,s to D-Set
    Remove s from S.

Figure 9:
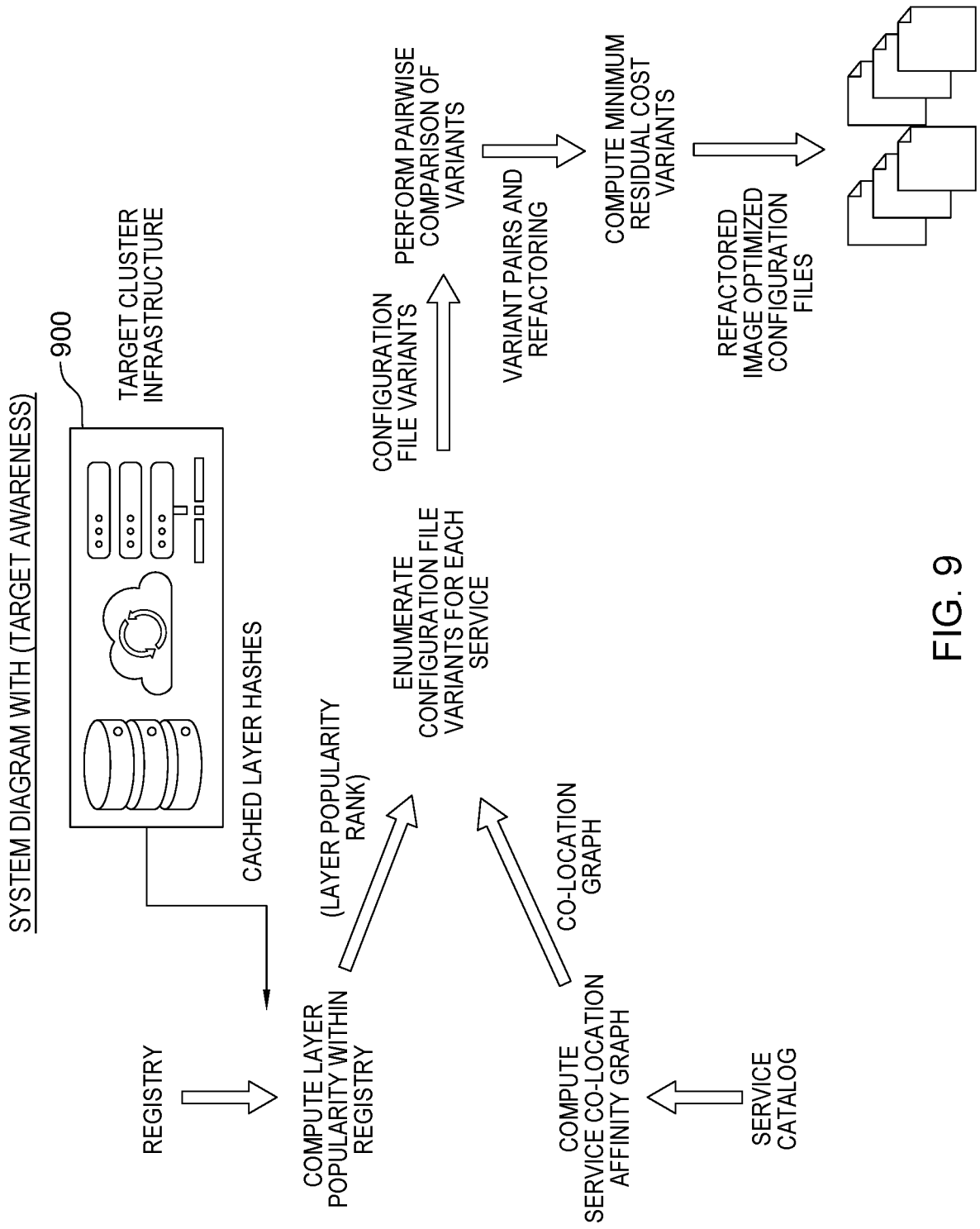
FIG. 9 depicts another example of refactoring logic to reconfigure one or more container images, in accordance with one or more aspects of the present invention.

By using the above processing, in one or more aspects, a total image size for a given deployment is reduced. Although one example of processing is provided above, many variations are possible. For instance, in another embodiment, deployment state of one or more layers is taken into consideration. For instance, referring to FIG. 9, layers that are cached in a cache (e.g., cache 900) are prioritized. For instance, those layers are provided with a maximum popularity score and the procedure described with reference to FIG. 7 is performed. Many other variations are possible without departing from one or more aspects of the present invention.

As described herein, in one or more aspects, a total image size for a given deployment is adjusted (e.g., reduced). In one example, one or more configuration files for one or more images being deployed in a given deployment are refactored to reduce the total image size for the given deployment. This refactoring is performed, for instance, based on the context of the service deployment and without requiring changes to existing container life-cycle infrastructure or registry architecture, which reduces complexity. The refactoring considers characteristics of an enterprise catalog of services (such as, e.g., common dependencies used, co-location of services of the service catalog, etc.) and/or layer usage characteristics, which may impact the resource footprint of an image.

In one or more aspects, images/image sizes of images being deployed in a given deployment are optimized such that the total image size for a given deployment is reduced. Optimizing images may include tactically adding redundancy, which may increase absolute image size, but results in lower image sizes during deployment. Splitting and merging layers may lead to improved layer reuse; although, it goes against conventional practice of reducing images sizes by reducing layers. Optimization protocols may rely on selected criteria, including, but not limited to, registry access patterns and/or service-catalog characteristics, as examples.

In one or more aspects, configuration files are refactored (i.e., reconfigured or restructured without altering functionality) using protocols that factor in, e.g., service-catalog and container layer traffic characteristics to optimize images relative to a given deployment resulting in, e.g., reduced node resource and network usage. This optimization uses, in one or more examples, existing container registries (e.g., registry architecture need not be changed) and does not require that the middleware that interacts with the registries for management and layer distribution be altered. Further, image format changes are not needed; thus, specialized drivers for custom image formats are also not needed.

In one or more aspects, processing is performed to refactor a configuration file or container image size relative to a given deployment. The processing includes, in one embodiment, computing layer popularity within a registry (e.g., compute layer popularity from container registry metadata); computing service co-location affinity graph (e.g., determine affinity section of individual services by analyzing deployment artifacts); enumerating configuration file variants (image layer configurations) for each service (or selected services) of a service-catalog (e.g., enumerate/list configuration file variants for each service of a service catalog, in which each configuration file of each service is used to seed variants by combining an incremental combination of its layers); performing pairwise comparison of variants (e.g., perform a pairwise comparison of the configuration file variants to discover matches in layers and compute residual gain in size reduction post-refactoring); and computing minimum residual cost variants (e.g., identify the layer configuration variants with minimum residual size greedily (e.g., select the layer configuration variant which results in largest residual gain over all services (or selected services), then select the layer configuration variant with the second largest residual size for the remaining services, and so on).

One or more aspects of the present invention are tied to computer technology and facilitate processing within a computer, improving performance thereof. By optimizing deployment of container images, processing is improved by reducing the amount of network traffic or repository traffic to obtain the image layers to be deployed, reducing the amount of cache or storage needed and/or reducing processing cycles. This improves processing within a processor, computer system and/or computing environment.

Further details of one embodiment of facilitating processing within a computing environment, as it relates to one or more aspects of the present invention, are described with reference to FIGS. 10A-10B.

Referring to FIG. 10A, in one embodiment, an indication of a plurality of container images to be deployed in a deployment to provide a plurality of services within a computing environment is obtained 1000. The plurality of container images of the deployment has a total layer size of a plurality of image layers of the plurality of container images 1002, and at least one container image of the plurality of container images is reconfigured to adjust the total layer size for the deployment 1004. In one aspect, the reconfiguring is based, for instance, on one or more deployment characteristics of the deployment and includes replacing at least one image layer of a container image of the at least one container image with one or more other image layers configured based on the plurality of container images to be deployed 1010.

By performing the reconfiguring based on one or more deployment characteristics, optimizations for the deployment are achieved. For instance, the total layer size of the plurality of container images is reduced in deployment. Further, network traffic to obtain image layers of the container images is reduced, as well as storage, such as cache memory, and processing cycles used in the deployment. Processing speed is improved.

In one example, the deployment characteristics include layer usage characteristics of one or more image layers, and in one aspect, layer usage characteristics for one or more image layers are determined. By employing layer usage characteristics, selected layers (such as frequently used layers) may be used to replace other layers of a container image, reducing the number of layers used in a deployment.

In another example, the deployment characteristics include at least one characteristic of the environment in which the plurality of container images is to be deployed, such as cache contents of at least one node in which one or more container images of the plurality of container images is to be deployed. By employing environment characteristics, selected layers (such as cached layers) may be used to replace other layers of a container image, reducing the number of layers used in a deployment. This reduces network traffic and/or other processing associated with obtaining the layers, improving processing speed and reducing storage requirements.

In one aspect, the container image includes a set of image layers 1020, and the reconfiguring includes, for instance, determining, using the set of image layers, one or more image layer configurations for the container image 1030 and comparing at least one image layer configuration of the container image with at least one image layer configuration of at least one other container image to determine multiple layer configuration variants 1032. As an example, a layer configuration variant of the multiple layer configuration variants includes at least one reconfigured image layer 1034. The reconfiguring further includes, in one embodiment, selecting, from the multiple layer configuration variants, a selected layer configuration variant to be used in the replacing the at least one image layer of the image 1036. The performing the comparing in the reconfiguring provides images that are optimized for a particular deployment, improving processing and reducing resource usage.

In one aspect, referring to FIG. 10B, the selecting is based on residual costs computed for the multiple layer configuration variants 1040. In one aspect, a determination is made as to whether one or more image layers of the multiple layer configuration variants are selected layers 1042, and in one aspect, a computation of a residual cost for a given layer configuration variant is based on whether the given layer configuration variant includes one or more selected layers 1044. The use of selected layers, such as frequently used layers, provides efficiencies in deployment, reduces the number of layers to be deployed and saves on resources.

In one aspect, a determination is made of co-location information for the plurality of container images 1050, and the co-location information is used, in one aspect, to determine the at least one other container image to be used in the comparing 1052. Deployment optimizations are realized when the deployed images are co-located.

In one aspect, at least one configuration file is provided, based on the reconfiguring, to deploy the at least one container image 1060.

Although aspects and embodiments are described herein, other variations, aspects and/or embodiments are possible.

For example, in one aspect, at least one container image of a plurality of container images to be deployed in a deployment to provide a plurality of services for a computing environment is reconfigured. The plurality of container images of the deployment has a total layer size for the plurality of container images, and the reconfiguring includes replacing at least one image layer of a set of image layers of a container image of the at least one container image with one or more other image layers configured based on one or more container images to be deployed to adjust the total layer size for the deployment. The reconfiguring includes determining, using the set of image layers, one or more image layer configurations for the container image, comparing at least one image layer configuration of the container image with at least one image layer configuration of at least one other container image to determine multiple layer configuration variants, and selecting, from the multiple layer configuration variants, a selected layer configuration variant to be used in the replacing the at least one image layer of the container image.

By performing the reconfiguring, optimizations for the deployment are achieved. For instance, the total layer size of the plurality of container images is reduced in deployment. Further, network traffic to obtain image layers of the container images is reduced, as well as storage, such as cache memory, and processing cycles used in the deployment. Processing speed is improved.

In one embodiment, the reconfiguring is based on one or more deployment characteristics of the deployment. As examples, the one or more deployment characteristics include one or more layer usage characteristics and one or more environment characteristics. By performing the reconfiguring based on one or more deployment characteristics, optimizations for the deployment are achieved. For instance, the total layer size of the plurality of container images is reduced in deployment. Further, network traffic to obtain image layers of the container images is reduced, as well as storage, such as cache memory, and processing cycles used in the deployment. Processing speed is improved.

Again, other aspects, variations and/or embodiments are possible.

Figure 11A:
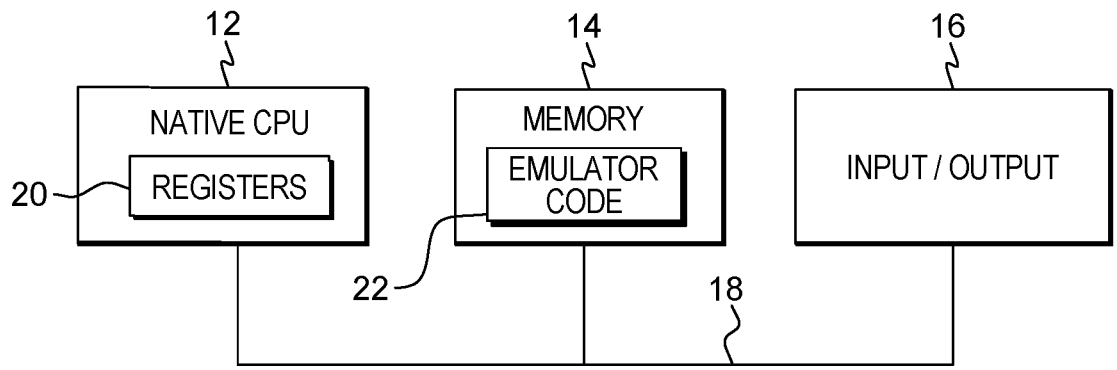
FIG. 11A depicts another example of a computing environment to incorporate and/or use one or more aspects of the present invention.

Aspects of the present invention may be incorporated in and/or used by many types of computing environments. Another example of a computing environment to incorporate and use one or more aspects of the present invention is described with reference to FIG. 11A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include an IBM® Power® processor offered by International Business Machines Corporation, Armonk, New York; an HP Superdome with Intel® processors offered by Hewlett Packard Co., Palo Alto, California; and/or other machines based on architectures offered by International Business Machines Corporation, Hewlett Packard, Intel Corporation, Oracle, or others. IBM® and Power® are trademarks or registered trademarks of International Business Machines Corporation in at least one jurisdiction. Intel® is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, e.g., the IBM® z/Architecture® instruction set architecture, such as Power processors, HP Superdome servers or others, to emulate the z/Architecture instruction set architecture and to execute software and instructions developed based on the z/Architecture instruction set architecture. z/Architecture® is a trademark or registered trademark of International Business Machines Corporation in at least one jurisdiction.

Figure 11B:
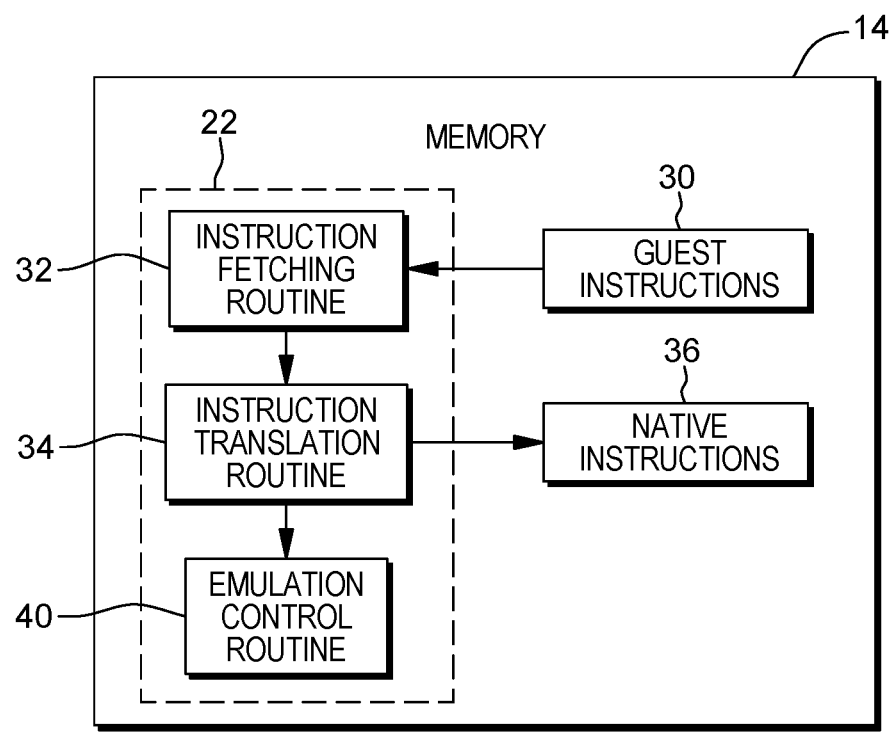
FIG. 11B depicts further details of the memory of FIG. 11A, in accordance with one or more aspects of the present invention.

Further details relating to emulator code 22 are described with reference to FIG. 11B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to optimize container deployment for a given deployment environment and/or to perform to one or more other aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
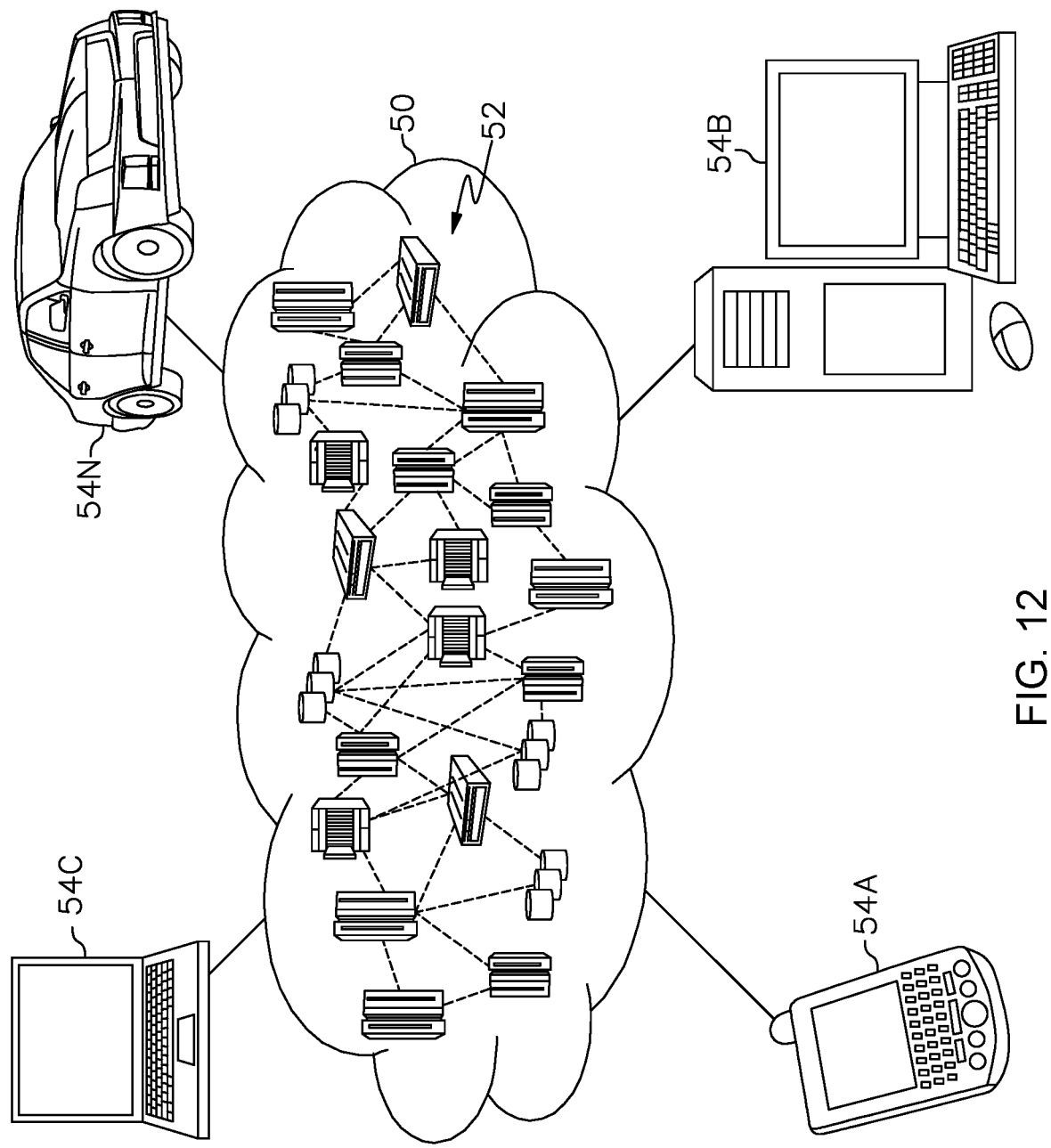
FIG. 12 depicts one embodiment of a cloud computing environment, in accordance with one or more aspects of the present invention.

Referring now to FIG. 12, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 52 and cloud computing environment 50 can communicate with any type of computerized device over any type of network and/or network addressable connection (e.g., using a web browser).

Figure 13:
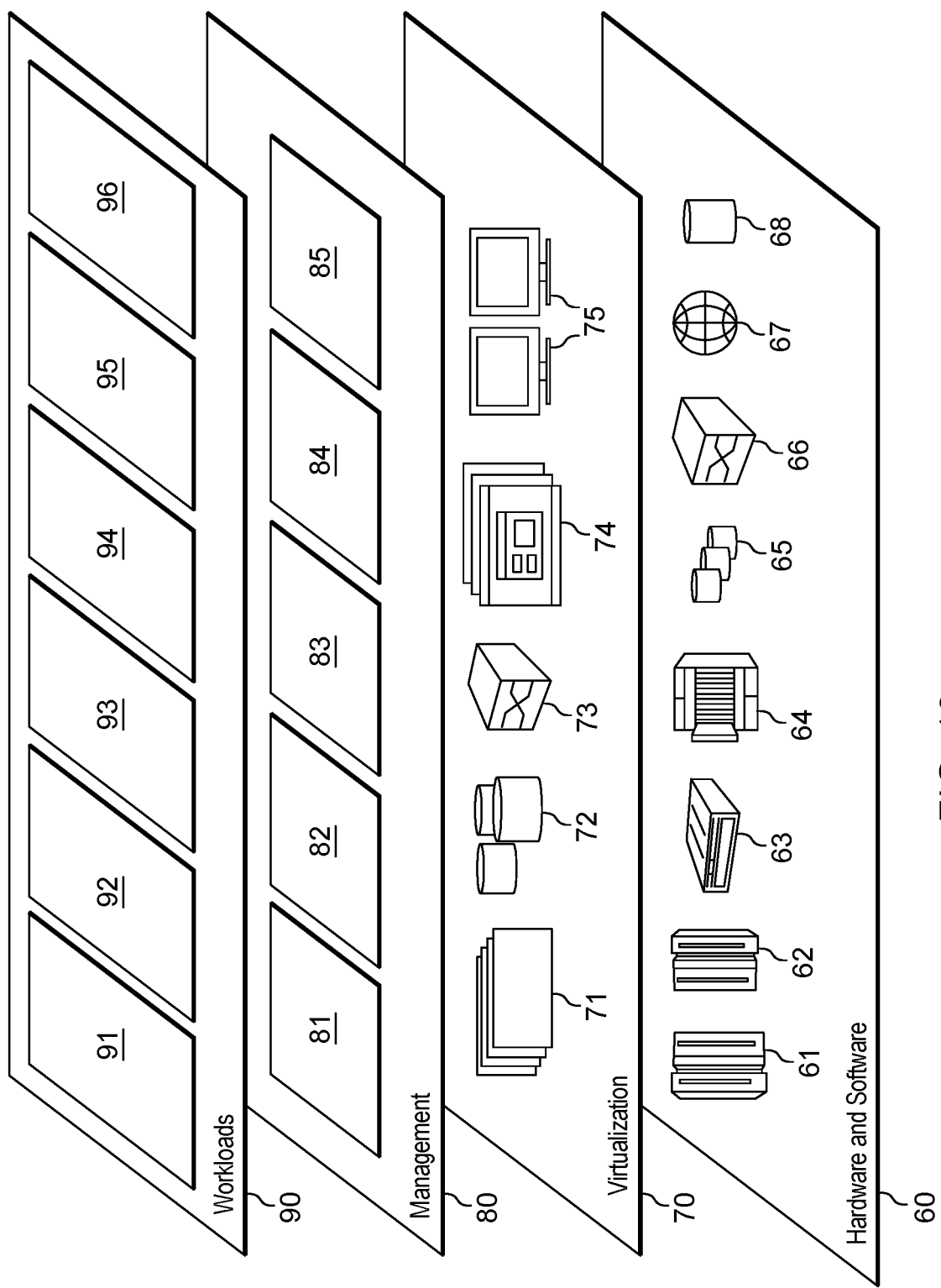
FIG. 13 depicts one example of abstraction model layers, in accordance with one or more aspects of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image optimization processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, additional, fewer and/or other deployment characteristics may be considered, as well as various variations to the processing logic. Many variations are possible.

Various aspects are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, said computer program product comprising:

one or more computer readable storage media and program instructions collectively stored on the one or more computer readable storage media readable by at least one processing circuit to perform a method comprising:

obtaining an indication of a plurality of container images to be deployed in a deployment to provide a plurality of services within the computing environment, the plurality of container images of the deployment having a total layer size of a plurality of image layers of the plurality of container images; and reconfiguring at least one container image of the plurality of container images to adjust the total layer size for the deployment, the reconfiguring being based on one or more deployment characteristics of the deployment and including replacing one image layer of a container image of the at least one container image with another image layer configured based on the plurality of container images to be deployed, wherein the another image layer is configured to optimize the deployment, and includes a same directive compared to the one image layer and an additional directive compared to the one image layer, the additional directive being a new addition to the container image of the at least one container image, the another image layer having a size greater than a size of the one image layer, and wherein the reconfiguring reduces the total layer size for the deployment by, at least, replacing the one image layer with the another image layer.

2. The computer program product of claim 1, wherein the one or more deployment characteristics of the deployment include layer usage characteristics of one or more image layers of the plurality of container images to be deployed.

3. The computer program product of claim 1, wherein the reconfiguring the at least one container image further includes eliminating an image layer of the container image based on the replacing the one image layer with the another image layer.

4. The computer program product of claim 1, wherein the one or more deployment characteristics of the deployment include at least one characteristic of the environment in which the plurality of container images is to be deployed.

5. The computer program product of claim 4, wherein the at least one characteristic of the environment includes cache contents of at least one node in which one or more container images of the plurality of container images is to be deployed.

6. The computer program product of claim 1, wherein the container image includes a set of image layers, and wherein the reconfiguring includes:
   determining, using the set of image layers, one or more image layer configurations for the container image;
   comparing at least one image layer configuration of the container image with at least one image layer configuration of at least one other container image to determine multiple layer configuration variants, wherein a layer configuration variant of the multiple layer configuration variants includes at least one reconfigured image layer; and
   selecting, from the multiple layer configuration variants, a selected layer configuration variant to be used in the replacing the one image layer of the container image.

7. The computer program product of claim 6, wherein the selecting is based on residual costs computed for the multiple layer configuration variants.

8. The computer program product of claim 7, wherein the method further includes determining whether one or more image layers of the multiple layer configuration variants are selected layers, wherein a computation of a residual cost for a given layer configuration variant is based on whether the given layer configuration variant includes one or more selected layers.

9. The computer program product of claim 6, wherein the method further comprises:
   determining co-location information for the plurality of container images; and
   using the co-location information to determine the at least one other container image to be used in the comparing.

10. The computer program product of claim 1, wherein the method further comprises providing at least one configuration file, based on the reconfiguring, to deploy the at least one container image.

11. A computer system for facilitating processing within a computing environment, the computer system comprising:
   a memory; and
   a processor in communication with the memory, wherein the computer system is configured to perform a method, said method comprising:
      obtaining an indication of a plurality of container images to be deployed in a deployment to provide a plurality of services within the computing environment, the plurality of container images of the deployment having a total layer size of a plurality of image layers of the plurality of container images; and
      reconfiguring at least one container image of the plurality of container images to adjust the total layer size for the deployment, the reconfiguring being based on one or more deployment characteristics of the deployment and including replacing one image layer of a container image of the at least one container image with another image layer configured based on the plurality of container images to be deployed, wherein the another image layer is configured to optimize the deployment, and includes a same directive compared to the one image layer and an additional directive compared to the one image layer, the additional directive being a new addition to the container image of the at least one container image, the another image layer having a size greater than a size of the one image layer, and wherein the reconfiguring reduces the total layer size for the deployment by, at least, replacing the one image layer with the another image layer.

12. The computer system of claim 11, wherein the one or more deployment characteristics of the deployment include layer usage characteristics of one or more image layers of the plurality of container images to be deployed.

13. The computer system of claim 11, wherein the one or more deployment characteristics of the deployment include at least one characteristic of the environment in which the plurality of container images is to be deployed.

14. The computer system of claim 11, wherein the container image includes a set of image layers, and wherein the reconfiguring includes:
   determining, using the set of image layers, one or more image layer configurations for the container image;
   comparing at least one image layer configuration of the container image with at least one image layer configuration of at least one other container image to determine multiple layer configuration variants, wherein a layer configuration variant of the multiple layer configuration variants includes at least one reconfigured image layer; and
   selecting, from the multiple layer configuration variants, a selected layer configuration variant to be used in the replacing the one image layer of the container image.

15. The computer system of claim 14, wherein the selecting is based on residual costs computed for the multiple layer configuration variants.

16. A computer-implemented method of facilitating processing within a computing environment, the computer-implemented method comprising:
   obtaining an indication of a plurality of container images to be deployed in a deployment to provide a plurality of services within the computing environment, the plurality of container images of the deployment having a total layer size of a plurality of image layers of the plurality of container images; and
   reconfiguring at least one container image of the plurality of container images to adjust the total layer size for the deployment, the reconfiguring being based on one or more deployment characteristics of the deployment and including replacing one image layer of a container image of the at least one container image with another image layer configured based on the plurality of container images to be deployed, wherein the another image layer is configured to optimize the deployment, and includes a same directive compared to the one image layer and an additional directive compared to the one image layer, the additional directive being a new addition to the container image of the at least one container image, the another image layer having a size greater than a size of the one image layer, and wherein the reconfiguring reduces the total layer size for the deployment by, at least, replacing the one image layer with the another image layer.

17. The computer-implemented method of claim 16, wherein the one or more deployment characteristics of the deployment include layer usage characteristics of one or more image layers of the plurality of container images to be deployed.

18. The computer-implemented method of claim 16, wherein the one or more deployment characteristics of the deployment include at least one characteristic of the environment in which the plurality of container images is to be deployed.

19. The computer-implemented method of claim 16, wherein the container image includes a set of image layers, and wherein the reconfiguring includes:
determining, using the set of image layers, one or more image layer configurations for the container image;
comparing at least one image layer configuration of the container image with at least one image layer configuration of at least one other container image to determine multiple layer configuration variants, wherein a layer configuration variant of the multiple layer configuration variants includes at least one reconfigured image layer; and
selecting, from the multiple layer configuration variants, a selected layer configuration variant to be used in the replacing the one image layer of the container image.

20. The computer-implemented method of claim 19, wherein the selecting is based on residual costs computed for the multiple layer configuration variants.

21. A computer program product for facilitating processing within a computing environment, said computer program product comprising:
one or more computer readable storage media and program instructions collectively stored on the one or more computer readable storage media readable by at least one processing circuit to perform a method comprising:
reconfiguring at least one container image of a plurality of container images to be deployed in a deployment to provide a plurality of services for the computing environment, the plurality of container images of the deployment having a total layer size for the plurality of container images, the reconfiguring including replacing one image layer of a set of image layers of a container image of the at least one container image with another image layer configured based on one or more container images to be deployed to adjust the total layer size for the deployment, wherein the another image layer is configured to optimize the deployment, and includes a same directive compared to the one image layer and an additional directive compared to the one image layer, the another image layer having a size greater than a size of the one image layer of the at least one container image, and wherein the reconfiguring reduces the total layer size for the deployment by, at least, replacing the one image layer with the another image layer, and wherein the reconfiguring includes:
determining, using the set of image layers, one or more image layer configurations for the container image;
comparing at least one image layer configuration of the container image with at least one image layer configuration of at least one other container image to determine multiple layer configuration variants, wherein co-location information determined for the plurality of container images is used to determine the at least one other container image to be used in the comparing; and
selecting, from the multiple layer configuration variants, a selected layer configuration variant to be used in the reconfiguring the at least one container image.

22. The computer program product of claim 21, wherein the reconfiguring is based on one or more deployment characteristics of the deployment.

23. The computer program product of claim 22, wherein the one or more deployment characteristics include one or more layer usage characteristics and one or more environment characteristics.

24. A system for facilitating processing within a computing environment, said system comprising:
a memory; and
a processor in communication with the memory, wherein the computer system is configured to perform a method, said method comprising:
reconfiguring at least one container image of a plurality of container images to be deployed in a deployment to provide a plurality of services for the computing environment, the plurality of container images of the deployment having a total layer size for the plurality of container images, the reconfiguring including replacing one image layer of a set of image layers of a container image of the at least one container image with another image layer configured based on one or more container images to be deployed to adjust the total layer size for the deployment, wherein the another image layer is configured to optimize the deployment, and includes a same directive compared to the one image layer and an additional directive compared to the one image layer, the another image layer having a size greater than a size of the one image layer of the at least one container image, and wherein the reconfiguring reduces the total layer size for the deployment by, at least, replacing the one image layer with the another image layer, and wherein the reconfiguring includes:
determining, using the set of image layers, one or more image layer configurations for the container image;
comparing at least one image layer configuration of the container image with at least one image layer configuration of at least one other container image to determine multiple layer configuration variants, wherein co-location information determined for the plurality of container images is used to determine the at least one other container image to be used in the comparing; and selecting, from the multiple layer configuration variants, a selected layer configuration variant to be used in the reconfiguring the at least one container image.

25. The system of claim 24, wherein the reconfiguring is based on one or more deployment characteristics of the deployment.

* * * * *